US006818594B1

(12) United States Patent
Freeman et al.

(10) Patent No.: US 6,818,594 B1
(45) Date of Patent: Nov. 16, 2004

(54) METHOD FOR THE TRIGGERED RELEASE OF POLYMER-DEGRADING AGENTS FOR OIL FIELD USE

(75) Inventors: Michael A. Freeman, Kingwood, TX (US); Monica Norman, Houston, TX (US); David A. Ballard, Stonehaven Aberdeenshire (GB); Ping Jiang, Sandnes (NO); Kenneth C. Symes, Keighley (GB); Kishor Kumar Mistry, Bradford (GB)

(73) Assignee: M-I L.L.C., Houston, TX (US)

( * ) Notice: Subject to any disclaimer, the term of this patent is extended or adjusted under 35 U.S.C. 154(b) by 272 days.

(21) Appl. No.: 09/711,655

(22) Filed: Nov. 13, 2000

Related U.S. Application Data
(60) Provisional application No. 60/165,393, filed on Nov. 12, 1999.

(51) Int. Cl.[7] .......................... E21B 43/27; E21B 43/16
(52) U.S. Cl. ...................... 507/101; 507/201; 507/100; 507/200; 507/902; 507/921; 507/922; 166/300; 166/301; 166/305.1; 166/308.2; 166/308.3; 166/308.4
(58) Field of Search ................................ 507/100, 101, 507/200, 201, 902, 921, 922; 166/300, 301, 305.1, 308.2, 308.3, 308.4, 308

(56) References Cited

U.S. PATENT DOCUMENTS

| | | | |
|---|---|---|---|
| 2,343,136 A | 2/1944 | Dobson et al. | 252/8.55 |
| 2,602,778 A | 7/1952 | Snyder et al. | 252/8.55 |
| 2,651,500 A | 9/1953 | Teichmann | 255/1.8 |
| 2,681,704 A | 6/1954 | Menaul | 166/22 |
| 2,801,218 A | 7/1957 | Menaul | 252/8.55 |
| 2,807,570 A | 9/1957 | Updegraff | 195/3 |
| 3,288,211 A | 11/1966 | Johnston | 166/9 |
| 3,628,615 A | 12/1971 | Chenevert | 175/65 |
| 3,634,227 A | 1/1972 | Patterson, Jr. | 210/11 |
| 3,635,797 A | 1/1972 | Battistoni et al. | 195/56 |
| 3,684,710 A | 8/1972 | Cayle et al. | 252/8.55 |
| 3,765,918 A | 10/1973 | Jordan et al. | 106/206 |
| 3,841,419 A | 10/1974 | Russell | 175/40 |
| 3,954,627 A | 5/1976 | Dreher et al. | 252/8.5 P |

(List continued on next page.)

FOREIGN PATENT DOCUMENTS

| | | | |
|---|---|---|---|
| DE | 221791 A1 | 2/1984 | E21B/43/00 |
| DE | 240905 A1 | 9/1985 | C09K/7/02 |
| EP | 0 030 393 B1 | 6/1983 | C12N/9/24 |

(List continued on next page.)

OTHER PUBLICATIONS

"Enzymatic Hydrolysis of Xanthan Gum at Elevated Temperatures and Salt Concentrations," Jeffrey A. Ahlgren, Ph.D., Gas, Oil, and Environmental Biotechnology VI, Institute of Gas Technology, 1995.

(List continued on next page.)

Primary Examiner—Philip C. Tucker
(74) Attorney, Agent, or Firm—Conely Rose LLP

(57) ABSTRACT

Disclosed are methods and related compositions for altering the physical and chemical properties of a substrate used in hydrocarbon exploitation, such as in downhole drilling operations. In a preferred embodiment a method involves formulating a fluid, tailored to the specific drilling conditions, that contains one or more inactivated enzymes. Preferably the enzyme is inactivated by encapsulation in a pH responsive material. After the fluid has been introduced into the well bore, one or more triggering signals, such as a change in pH, is applied to the fluid that will activate or reactivate the inactivated enzyme, preferably by causing it to be released by the encapsulation material. The reactivated enzyme is capable of selectively acting upon a substrate located downhole to bring about the desired change in the chemical or physical properties of the substrate.

81 Claims, 9 Drawing Sheets

U.S. PATENT DOCUMENTS

| | | |
|---|---|---|
| 3,966,618 A | 6/1976 | Colegrove .............. 252/8.55 D |
| 4,003,846 A | 1/1977 | Kuhn et al. .................. 252/316 |
| 4,016,085 A | 4/1977 | Finn et al. ................ 252/8.5 C |
| 4,039,028 A | 8/1977 | Knight ........................ 166/246 |
| 4,119,546 A | 10/1978 | Wernau ................. 252/8.55 D |
| 4,157,116 A | 6/1979 | Coulter ........................ 166/280 |
| 4,160,483 A | 7/1979 | Thomas et al. ............. 166/307 |
| 4,182,860 A | 1/1980 | Naslund et al. ............. 536/114 |
| 4,202,795 A | 5/1980 | Burnham et al. ............ 252/332 |
| 4,207,194 A | 6/1980 | Sharpe et al. .......... 252/8.55 B |
| 4,290,899 A | 9/1981 | Malone et al. ........... 252/8.5 A |
| 4,310,425 A | 1/1982 | Key et al. ................ 252/8.5 A |
| 4,326,037 A | 4/1982 | Griffith et al. .............. 435/274 |
| 4,342,866 A | 8/1982 | Kang et al. ................. 536/119 |
| 4,343,363 A | 8/1982 | Norton et al. .............. 166/281 |
| 4,359,392 A | 11/1982 | Rygg ........................ 252/8.55 R |
| 4,384,963 A | 5/1983 | Soepenberg et al. ..... 252/8.5 C |
| 4,406,798 A | 9/1983 | Miller et al. ........... 252/8.55 D |
| 4,410,625 A | 10/1983 | Cadmus ........................ 435/42 |
| 4,414,334 A | 11/1983 | Hitzman ..................... 435/262 |
| 4,423,781 A | 1/1984 | Thomas ....................... 166/312 |
| 4,450,908 A | 5/1984 | Hitzman ..................... 166/246 |
| 4,474,240 A | 10/1984 | Oliver, Jr. et al. .......... 166/312 |
| 4,479,543 A | 10/1984 | Kalfayan et al. ............ 166/300 |
| 4,486,340 A | 12/1984 | Glass, Jr. ................ 252/8.55 D |
| 4,502,967 A | 3/1985 | Conway ................ 252/8.55 R |
| 4,506,734 A | 3/1985 | Nolte .......................... 166/308 |
| 4,514,309 A | 4/1985 | Wadhwa ................. 252/8.55 R |
| 4,519,922 A | 5/1985 | Sutton et al. ............ 252/8.5 B |
| 4,535,153 A | 8/1985 | Kang et al. ................. 536/114 |
| 4,539,122 A | 9/1985 | Son et al. ............... 252/8.55 R |
| 4,541,485 A | 9/1985 | Block .......................... 166/281 |
| 4,552,591 A | 11/1985 | Millar ..................... 106/18.33 |
| 4,552,673 A | 11/1985 | Grolitzer ................ 252/8.55 D |
| 4,561,985 A | 12/1985 | Glass, Jr. ................. 252/8.5 A |
| 4,575,551 A | 3/1986 | Fujiyama et al. ........... 536/123 |
| 4,607,099 A | 8/1986 | Kanda et al. ................ 536/114 |
| 4,609,475 A | 9/1986 | Hanlon et al. .......... 252/8.55 B |
| 4,615,740 A | 10/1986 | Ppelezo et al. ............. 106/177 |
| 4,619,764 A | 10/1986 | Church et al. .............. 210/248 |
| 4,619,772 A | 10/1986 | Black et al. ............. 252/8.514 |
| 4,622,153 A | 11/1986 | Watson et al. ........... 252/8.514 |
| 4,665,985 A | 5/1987 | Berrod et al. ................ 166/281 |
| 4,690,891 A | 9/1987 | Hou et al. ...................... 435/42 |
| 4,713,449 A | 12/1987 | Vanderslice et al. ........ 536/123 |
| 4,741,401 A | 5/1988 | Walles et al. ................ 166/300 |
| 4,756,836 A | 7/1988 | Jeffrey et al. ............... 210/750 |
| 4,770,796 A | 9/1988 | Jacobs ..................... 252/8.553 |
| 4,809,783 A | 3/1989 | Hollenbeck et al. ........ 166/307 |
| 4,886,746 A | 12/1989 | Cadmus et al. ............... 435/42 |
| 4,899,818 A | 2/1990 | Jennings, Jr. et al. ....... 166/270 |
| 4,919,209 A | 4/1990 | King ........................... 166/300 |
| 4,928,763 A | 5/1990 | Falk ............................ 166/250 |
| 4,940,539 A | 7/1990 | Weber ........................ 210/149 |
| 4,941,533 A | 7/1990 | Buller et al. ................ 166/252 |
| 4,957,165 A | 9/1990 | Cantu et al. ................. 166/295 |
| 4,968,532 A | 11/1990 | Janssen et al. .............. 427/164 |
| 4,978,481 A | 12/1990 | Janssen et al. ............... 264/1.4 |
| 4,996,153 A | 2/1991 | Cadmus et al. ............. 435/209 |
| 5,032,297 A | 7/1991 | Williamson et al. ..... 252/8.551 |
| 5,035,900 A | 7/1991 | Langley et al. ............. 424/484 |
| 5,055,209 A | 10/1991 | Bridges et al. ............. 252/8.51 |
| 5,067,566 A | 11/1991 | Dawson ..................... 166/308 |
| 5,094,785 A | 3/1992 | Law et al. ..................... 264/4.3 |
| 5,102,558 A | 4/1992 | McDougall et al. ..... 252/8.551 |
| 5,102,559 A | 4/1992 | McDougall et al. ..... 252/8.551 |
| 5,103,905 A | 4/1992 | Brannon et al. ............ 166/250 |
| 5,106,518 A | 4/1992 | Cooney et al. .......... 252/8.551 |
| 5,110,486 A | 5/1992 | Manalastas et al. ..... 252/8.551 |
| 5,126,051 A | 6/1992 | Shell et al. .................. 210/632 |
| 5,164,099 A | 11/1992 | Gupta et al. .............. 252/8.551 |
| 5,165,477 A | 11/1992 | Shell et al. .................. 166/291 |
| 5,194,263 A | 3/1993 | Chamberlain et al. ...... 504/347 |
| 5,201,370 A | 4/1993 | Tjon-Joe-Pin ............... 166/300 |
| 5,224,544 A | 7/1993 | Tjon-Joe-Pin et al. ...... 166/295 |
| 5,226,479 A | 7/1993 | Gupta et al. ................. 166/300 |
| 5,247,995 A | 9/1993 | Tjon-Joe-Pin et al. ...... 166/312 |
| 5,310,721 A | 5/1994 | Lo ............................. 504/116 |
| 5,324,445 A | 6/1994 | Langley et al. ......... 252/174.12 |
| 5,370,184 A | 12/1994 | McDougall et al. ........ 166/278 |
| 5,373,901 A | 12/1994 | Norman et al. ............. 166/300 |
| 5,421,412 A | 6/1995 | Kelly et al. ................. 166/300 |
| 5,437,331 A * | 8/1995 | Gupta et al. ................. 166/308 |
| 5,441,109 A | 8/1995 | Gupta et al. ................. 166/300 |
| 5,447,197 A | 9/1995 | Rae et al. .................... 166/293 |
| 5,460,817 A | 10/1995 | Langley et al. ............. 424/408 |
| 5,492,646 A | 2/1996 | Langley et al. ............. 252/174 |
| 5,551,515 A | 9/1996 | Fodge et al. ................ 166/300 |
| 5,562,160 A | 10/1996 | Brannon et al. ......... 166/250.1 |
| 5,566,759 A | 10/1996 | Tjon-Joe-Pin et al. ...... 166/300 |
| 5,580,844 A | 12/1996 | Swarup et al. .............. 507/201 |
| 5,591,700 A | 1/1997 | Harris et al. ................ 507/204 |
| 5,604,186 A | 2/1997 | Hunt et al. .................. 507/204 |
| 5,678,631 A | 10/1997 | Salisbury et al. ........... 166/304 |
| 5,678,632 A | 10/1997 | Moses et al. ................ 166/307 |
| 5,805,264 A | 9/1998 | Janssen et al. ........... 351/160 R |
| 5,806,597 A | 9/1998 | Tjon-Joe-Pin et al. ...... 166/300 |
| 5,813,466 A | 9/1998 | Harris et al. ................ 166/300 |
| 5,837,290 A | 11/1998 | Hasslin ....................... 424/489 |
| 5,881,813 A | 3/1999 | Brannon et al. ............ 166/304 |
| 5,895,757 A | 4/1999 | Pope ........................... 435/176 |
| 5,908,623 A | 6/1999 | Baetge et al. ............. 424/93.21 |
| 5,914,182 A | 6/1999 | Drumheller ............... 428/308.4 |
| 5,916,790 A | 6/1999 | Enevold ...................... 435/178 |
| 5,932,385 A | 8/1999 | Takamura et al. ............. 430/63 |
| 5,948,735 A | 9/1999 | Newlove et al. ............ 507/238 |
| 5,955,503 A | 9/1999 | Leone-Bay et al. ......... 514/563 |
| 5,962,015 A | 10/1999 | Delrieu et al. .............. 424/450 |
| 5,965,121 A | 10/1999 | Leone-Bay et al. ........ 424/85.2 |
| 5,968,794 A | 10/1999 | Samain et al. .............. 435/178 |
| 5,972,387 A | 10/1999 | Milstein et al. ............. 424/491 |
| 6,069,118 A | 5/2000 | Hinkel et al. ............... 507/277 |
| 6,110,875 A | 8/2000 | Tjon-Joe-Pin et al. ...... 507/201 |
| 6,131,661 A | 10/2000 | Conner et al. .............. 166/300 |
| 6,138,760 A | 10/2000 | Lopez et al. ................ 166/300 |
| 6,140,277 A | 10/2000 | Tibbles et al. .............. 507/201 |
| 6,617,285 B2 * | 9/2003 | Crews ........................ 507/201 |
| 6,642,185 B2 * | 11/2003 | Crews ........................ 507/273 |

FOREIGN PATENT DOCUMENTS

| | | | |
|---|---|---|---|
| EP | 0 356 239 B1 | 2/1995 | .......... C11D/3/386 |
| EP | 0 880 892 A1 | 2/1998 | .......... A01N/25/10 |
| EP | 0 954 966 A1 | 11/1999 | .......... A01N/25/10 |
| EP | 0 361 677 B2 | 7/2001 | .......... C11D/17/00 |
| GB | 2 283 519 B | 5/1995 | .......... E21B/37/08 |
| GB | 2 338 254 A | 12/1999 | .......... E21B/37/06 |
| WO | WO 91/18974 | 12/1991 | .......... C12N/9/00 |
| WO | WO 97/24178 | 12/1991 | .......... B01J/13/16 |
| WO | WO 92/20771 | 11/1992 | .......... C11D/3/386 |
| WO | WO 94/01654 | 1/1994 | .......... E21B/37/08 |
| WO | WO 98/20230 | 5/1998 | .......... E21B/37/06 |

OTHER PUBLICATIONS

SPE 36429, by Beall et al., "Evaluation of a New Technique for Removing Horizontal Wellbore Damage Attributable to Drill–in Filter Cake," Oct. 6–9, 1996.

Borman, "Bacteria That Flourish Above 100° C Could Benefit Industrial Processing," C&EN—Science/Technology, 31–34, Nov. 4, 1991.

SPE 29822, Brannon and Tjon–Joe–Pin, "*Application of Polymeric Damage Removal Treatment Results in MultiFold Well Productivity Improvement: A Case Study,*" pp. 491–501, Mar. 11–14, 1995.

SPE 28513, Brannon and Tjon–Joe–Pin, "*Biotechnological Breakthrought Improves Performance of Moderate to High–Temperature Fracturing Applications,*" pp. 513–530, Sep. 25–28, 1994.

SPE 27393, Burnett, "*Using a Physical Wellbore Model to Study Formation Damage Problems In Well Completions,*" pp. 495–504, Feb. 7–10, 1994.

Cadmus and Slodki, "*Bacterial Degradation of Xanthan Gum,*" Industrial Polysaccharides: Genetic Engineering, Structure/Property Relations and Applications edited by M. Yalpani, pp. 101–107, 1987.

Cadmus and Slodki, "*Enzymic Breakage of Xanthan Gum Solution Viscosity in the Presence of Salts,*" Developments in Industrial Microbiology, 26:281–289, Aug. 11–17, 1984.

Chilingarian, et al., "*Drilling and Drilling Fluids, Development in Petroleum Science,*" p. 11, 1981.

Helmick and Longley, "*Pressure–Differential Sticking of Drill Pipe and How it Can Be Avoided or Relieved,*" API Drill. Prod. Prac., pp. 55–60, 1957.

SPE 31082, Hodge et al., "*Evaluation and Selection of Drill–in Fluid Candidates to Minimize Formation Damage,*" pp. 101–115, Feb. 14–15, 1996.

Jeanes, "*Applications of Extracellular Microbial Polysaccharide–Polyelectrolytes: Review of Literature, Including Patents,*" J. Polymer Sci.: Symposium No. 45, 209–227, 1974.

Kelly and Brown, "*Enzymes From High–Temperature Microorganisms,*" Current Opinion in Biotechnology, 4:188–192, 1993.

H.D. Outmans, "*Mechanics of Differential–Pressure Sticking of Drill Collars,*" Trans. AIME, vol. 213, pp. 265–274, 1958.

LeBlanc, "*Limiting, Treating Formation Damage in Horizontal, Extended Reach Wells Offshore*" pp. 56–61, Jun. 1996.

McLarty et al., "*Overview of Offshore Horizontal Drilling/Completion Projects in Unconsolidated Sandstones in the Gulf of Mexico,*" OTC 7352, 861–868, May 3–6, 1993.

SPE 30528, Ryan et al., "*Mud Clean–Up in Horizontal Wells: A Major Joint Industry Study,*" pp. 801–810, Oct. 22–25, 1995.

M.J. Economides et al., "*Petroleum Well Construction,*" John Wiley and Sons, N.Y., p. 121, 1988.

Slodki and Cadmus, "*Production and Stability of Xanthan Gums; Xanthanases and Their Applicability,*" Microbes and Oil Recovery vol. 1, International Bioresources Journal, pp. 190–199, 1985.

Cadmus et al., "*High–Temperature, Salt–Tolerant Xanthanase,*" Journal of Industrial Microbiology, 4:127–133, 1993.

Cadmus et al., "*Biodegradation of Xanthan Gum by Bacillus sp.,*" Applied and Environmental Microbiology, 5–11, 1982.

Ahlgren, "*Characterization of Xanthan Gum Degrading Enzymes from a heat–stable, Salt–tolerant Bacterial Consortium,*" in Microbial Enhancement of Oil Recovery: Recent Advances, edited by Premuzic and Woodhead; published by Elsevier: Amsterdam, pp. 55–63, 1993.

H.C.H. Darley & George R. Gary, "*Composition and Properties of Drilling and Completion Fluids,*" ($5^{th}$ Ed.), pp. 1–37, 1988.

Ahlgren, "*Purification and Characterization of a Pyruvated–Mannose–Specific Xanthan Lyase from Heat–Stable, Salt–Tolerant Bacteria,*" Applied and Environmental Microbiology, 57(9):2523–2528, Sep. 1991.

Ahlgren, "*Purification and Properties of a Xanthan Depolymerase from a Heat–Stable Salt–Tolerant Bacterial Consortium,*" Journal of Industrial Microbiology, 12:87–92, 1993.

SPE 39439, H.J.K. Ladva et al., "*Mechanisms of Sand Control Screen Plugging From DRill–In Fluids and Its Cleanup Using Acid, Oxidizers and Enzyme Breakers,*" Feb. 18, 1998.

SPE 50709, "*New Enzyme Process for Downhole Cleanup of Reservoir Drilling Filtering Cake,*" (1999).

SPE 58749, "*Factors Affecting the Performance of Enzyme Breakers for Removal of Xanthan–Based Filter Cakes,*" M.R. Luyster, T.D. Monroe, S.A. Ali, Feb. 23–24, 2000.

SPE 19433 (Part 1), "*Encapsulated Breaker for Aqueous Polymeric Fluids,*" J. Gulbis, M.T. King, G.W. Hawkins, and H.D. Brannon, Society of Petroleum Engineers, Inc., Feb. 22–23, 1990.

SPE 19433 (Part 2), "*Encapsulated Breaker for Aqueous Polymeric Fluids,*" J. Gulbis, M.T. King, G.W. Hawkins, and H.D. Brannon, Society of Petroleum Engineers, Inc., Feb. 1992.

"*New Applications for Enzymes in Oil and Gas Production,*" R.E. Harris, I.D. McKay, Petroleum Engineer International, pp. 65–69, Apr. 1999.

IADC/SPE 39380, "*New Treatment for Removal of Mud Polymer Damage in Multi–Lateral Wells Drilled Using Starch Based Fluids,*" by K.P. O'Driscoll and N.M. Amin, BJ Services Co. Middle East, and I.Y. Tantawi, Zakum Development, IADC/SPE Drilling Conference, 1998.

SPE 35594, "*Utilization of Polymer Linkage Specific Enzymes to Degrade HEC Polymer in Water Based Drilling and Gravel Packing Fluids,*" by W.D. Wood, SPE, BJ Services, E.L. Dennis, SPE, Chevron U.S.A., Gregory D. Dean, SPE BJ Services, Society of Petroleum Engineers, 1996.

SPE 38570, "*Field Experience Validates Effectiveness of Drill–In Fluid Cleanup System,*" by B.B. Beall, SPE, R. Tjon–Joe–Pin, SPE, and H.D. Brannon, SPE, BJ Services Co., U.S.A., Society of Petroleum Engineers, 1997.

SPE 38162, "*Biotechnological Treatment Removes Xanthan–Based Skin Damage,*" by R.M. Tjon–Joe–Pin, SPE, B.B. Beall, H.D. Brannon, SPE, BJ Services Co., Society of Petroleum Engineers, 1997.

\* cited by examiner

US 6,818,594 B1

METHOD FOR THE TRIGGERED RELEASE OF POLYMER-DEGRADING AGENTS FOR OIL FIELD USE

CROSS-REFERENCE TO RELATED APPLICATIONS

This application claims the benefit of U.S. Provisional Patent Application No. 60/165,393 filed Nov. 12, 1999.

BACKGROUND OF THE INVENTION

1. Field of the Invention

The present invention generally relates to compositions and methods used for hydrocarbon exploitation such as in the drilling of and production from wells, especially oil and gas wells. More particularly, the invention relates to such compositions and methods which alter the physical or chemical properties of a polymeric component of an oil field fluid or residue, such as decomposing a polymeric viscosifier or fluid loss control agent contained in such fluid or residue in response to a defined chemical or physical signal.

2. Description of Related Art

The selection of materials for well construction is essential to the successful completion of an oil or gas well. Among the most important is the selection of a drilling fluid. A drilling fluid having the desired properties is passed down through the drill pipe, out a nozzle at the drill bit, and returned to the surface through an annular portion of the well bore. The drilling fluid primarily functions to remove cuttings from the bore hole; lubricate, cool and clean the drill bit; reduce friction between the drilling string and the sides of the bore hole; maintain stability of the bore hole; prevent the inflow of fluids from permeable rock formations; and provide information on downhole conditions. The composition of a drilling fluid is carefully selected to optimize production within the vast diversity of geological formations and environmental conditions encountered in oil and gas recovery. At the same time, the fluid should not present a risk to personnel, drilling equipment, or the environment.

Drilling fluids may be water, oil, synthetic, or gas based. The composition is typically tailor-made to specific drilling conditions, varying in size and distribution of suspended particles, density, temperature, pH, pressure, salt concentration, alkalinity, electrical conductivity, lubricity, and corrosivity, all of which may be influenced by the surrounding geological formations. Further explanation of the properties of fluids useful in the recovery of oil and gas may be obtained from a review of the publication, H. C. H. DARLEY & GEORGE R. GRAY, COMPOSITION AND PROPERTIES OF DRILLING AND COMPLETION FLUIDS 1–37 ($5^{th}$ ed. 1988); and CHILINGARIAN, ET AL., DRILLING AND DRILLING FLUIDS, DEVELOPMENTS IN PETROLEUM SCIENCE 11 (1981).

Water-based drilling fluids, or muds, may consist of polymers, biopolymers, clays and organic colloids added to an aqueous based fluid to obtain the required viscous and filtration properties. Heavy minerals, such as barite or calcium carbonate, may be added to increase density. Solids from the formation are incorporated into the mud and often become dispersed in the mud as a consequence of drilling. Further, drilling muds may contain one or more natural and/or synthetic polymeric additives, including polymeric additives that increase the rheological properties (e.g., plastic viscosity, yield point value, gel strength) of the drilling mud, and polymeric thinners and flocculents.

Polymeric additives included in the drilling fluid may act as fluid loss control agents. Fluid loss control agents, such as starch, prevent the loss of fluid to the surrounding formation by reducing the permeability of filter cakes formed on the newly exposed rock surface. In addition, polymeric additives are employed to impart sufficient carrying capacity and thixotropy to the mud to enable the mud to transport the cuttings up to the surface and to prevent the cuttings from settling out of the mud when circulation is interrupted.

Most of the polymeric additives employed in drilling mud are resistant to biodegration, extending the utility of the additives for the useful life of the mud. Specific examples of biodegradation resistant polymeric additives employed include biopolymers, such as xanthans (xanthan gum) and scleroglucan; various acrylic based polymers, such as polyacrylamides and other acrylamide based polymers; and cellulose derivatives, such as dialkylcarboxymethylcellulose, hydroxyethylcellulose and the sodium salt of carboxy-methylcellulose, chemically modified starches, guar gum, phosphomannans, scleroglucans, glucans, and dextrane. See U.S. Pat. No. 5,165,477, which is incorporated herein by reference.

Most drilling fluids are designed to form a thin, low-permeability filter cake to seal permeable formations penetrated by the bit. This is essential to prevent both the loss of fluids to the formation and the influx of fluids that may be present in the formation. Filter cakes often comprise bridging particles, cuttings created by the drilling process, polymeric additives, and precipitates.

For a filter cake to form, it is important that the mud contain bridging particles, particles of a size selected to seal the pore openings in the formation. While finer particles may be carried deeper into a formation, bridging particles are trapped in the surface pores, and form the foundation for the filter cake. The bridged zone in the surface pores begins to trap successively smaller particles, and fluids interchange until an essentially impenetrable barrier is formed.

The formation of a filter cake seal is fostered by an imbalance of pressure of the mud column over the pressure exerted by fluids within the formation. It is recommended that drilling fluid pressure exceed the pressure exerted by fluids in the pores of the formation by about 200 psi. Pore pressure depends on the depth of the formation, the density of the pore fluids, and geological conditions. Similarly, the outward pressure exerted by the drilling fluid is a function of the density of the drilling fluid and the depth of the formation in question.

Since the outward pressure of the mud column is usually greater than the pressure exerted by the pore formation, it is also a primary function of the filter cake to prevent drilling fluid from continuously permeating into formations surrounding the well bore. The permeability of the filter cake is dependent upon particle distribution and size, in addition to electrochemical conditions of the mud. The composition of the drilling fluid can be adjusted to increase or decrease permeability, for example, by adding soluble salts, or increasing the number of particles in the colloidal size range. Fluid from the mud which permeates the barrier is known as filtrate. The probability of successful completion of a well may depend, in large part, upon the filtration properties of the mud being matched to the geological formations, and the composition of the filtrate. For further explanation of the properties and formation of filter cakes, see H. C. H. Darley and George R. Gray, COMPOSITION AND PROPERTIES OF DRILLING AND COMPLETION FLUIDS, ($5^{th}$ ed., 1988).

Although filter cake formation is essential to drilling operations, the filter cake can be a significant impediment to the production of hydrocarbon or other fluids from the well.

Damage to producing formations can occur by directly plugging the surface of the rock, M. J. Economides, et al., PETROLEUM WELL CONSTRUCTION, John Wiley and Sons, N.Y., 1988, p.121, or indirectly by plugging the hardware placed in the well. Ladva, H. K. J., et al., "Mechanisms of Sand Control Screen Plugging From Drill-In Fluids and its Cleanup Using Acid, Oxidizers and Enzyme Breakers," SPE 39439 (Feb. 18, 1998). Removal of the blockage presented by the filter cake may be essential to the commercial viability of the well. Many methods are used to remove filter cake damage, including concentrated acids, strong oxidizers, chelating agents and enzymes. Because enzymes are highly specific, they do not react or degrade the materials commonly found within a subterranean formation or used in well bore operations, such as limestone, iron, resin coated proppants, tubings and the like. This makes enzymes an excellent candidate to destroy the filter cake without harming the completion hardware or personnel.

As disclosed by U.S. Pat. No. 5,247,995 ("the '995 patent"), incorporated herein by reference, the permeability of a formation may be assessed in a laboratory. One procedure of assessing the permeability measures the flow of a fluid through a damaged formation sample at a given rate and pressure. As reported, a completely broken filter cake regains greater than about 95% of the initial permeability of a formation sample using a damage permeability test, while a plugged formation has about 30% of the initial permeability, depending on the fluid, core and conditions. A second procedure assesses the retained conductivity of the formation. As reported, a plugged formation has retained conductivity of less than 10%, depending on the conditions.

Therefore, removal of the filter cake is necessary to increase flow of production fluids from the formation. Since filter cake is compacted and often adheres strongly to the formation, it may not be readily or completely flushed out of the formation by fluid action alone. Removal of the filter cake often requires some additional treatment. Common oxidants, for example, persulfates, may be used to remove filter cake. As the '995 patent disclosed, however, oxidants are ineffective at low temperature ranges, from ambient temperature to 130° F. As reported, in this temperature range the oxidants are stable and do not readily undergo homolytic cleavage to initiate the degradation of the filter cake. Cleavage is typically achieved at lower temperatures only by using high concentrations of oxidizers. High oxidizer concentrations are frequently poorly soluble under the treatment conditions.

Reactions involving common oxidants are also often difficult to control. Oxidants tend to react with many things other than their intended target. For example, oxidants can react with iron found in the formation, producing iron oxides that precipitate and damage the formation, decreasing permeability. Oxidants can also react non-specifically with other materials used in the oil industry, for example, tubings, linings and resin coated proppants.

Further, to completely remove the filter cake after treating with oxidants, additional treatment may be required. An extra acid hydrolysis step may be necessary to remove any residue. Treatment with an acid, for example, hydrochloric acid, augments the removal of excess residue. Acid treatments, however, corrode steel and equipment used in the operation. Acid treatments may also be incompatible with the formation and/or its fluids.

Residues, such as filter cakes, can also present difficulties during drilling operations. For example, in permeable formations, filtration properties must be controlled to prevent thick filter cakes from excessively reducing the gauge of the borehole. Further, poor filter cakes may cause the drill pipe to become stuck, known as "differential sticking." Helmick and Longley, "Pressure-Differential Sticking of Drill Pipe and How it Can Be Avoided or Relieved," API Drill. Prod. Prac. (1957). pp.55-60; Outmans, H. D., "Mechanics of Differential-Pressure Sticking of Drill Collars," Trans. AIME, Vol. 213 (1958). pp.265–274. This occurs when part of the drill string bears against the side of the hole while drilling, and erodes away part of the filter cake. When rotation of the pipe is stopped, the part of the pipe in contact with the cake is isolated from the pressure of the mud column, and is subject only to the pore pressure of the filter cake. The differential pressure thus created causes drag which can be sufficient to prevent the pipe from being moved. Sometimes, the pipe can be freed by spotting oil around the stuck section, but if this procedure fails, more expensive and time consuming methods are entailed (H. C. H. DARLEY & GEORGE R. GRAY, COMPOSITION AND PROPERTIES OF DRILLING AND COMPLETION FLUIDS 405–11 ($5^{th}$ ed. 1988)).

In addition, drilling fluid residues remaining in the well tend to interfere with other phases of drilling and completion operations such as cementing the casing to the wall of the bore. Filter cake and residual mud can prevent casing cement from properly bonding to the wall of the bore. The trajectory of a well bore may be tortuous, and the wall of the bore often has various ledges and cavities therein which contain thixotropic drilling mud. The drilling mud in contact with the bore wall is quiescent while the casing is lowered into the bore and tends to gel. When circulation is resumed, the fluid pumped through the casing and up through the annulus between the casing and the bore wall makes paths or channels or even bypasses the "gelled" mud contained by the ledges and cavities.

Thus, cement pumped through the casing and up through the annulus to cement the casing to the bore wall flows through the paths or channels in the mud leaving large pockets of mud between the casing and the bore wall. These pockets can ultimately result in fluid communication with formation zones that the cement is supposed to isolate.

In an attempt to solve the above-noted problem, special fluids are often circulated through the annulus between the casing and the wall of the bore before the casing is cemented to remove mud remaining therein. Unfortunately, this procedure, often referred to as a "spacer" flush, is inadequate in many applications. Conventional flushing fluids are not always capable of sufficiently decreasing the gel strength, viscosity and other rheological properties of the mud caused by polymeric additives therein. As a result, the mud cannot be flushed out of the well. Instead, expensive squeeze cementing operations are carried out to fill in the gaps in the cement caused by the mud. For example, see U.S. Pat. No. 5,165,477, incorporated herein by reference.

Enzymes are a class of proteins that are responsible for catalyzing almost every chemical reaction that occurs in living organisms. They are characterized by two remarkable qualities: (1) to act as catalysts, often increasing the rate of a chemical reaction by as much as $10^6$–$10^{12}$ times that of an uncatalyzed reaction; and (2) their high degree of specificity, the ability to act selectively on one substance or a small number of chemically similar substances. As a catalyst, enzyme structure remains unaltered as a result of reaction with the substrate, thus, the enzyme may initiate another reaction, and so on. However, as nature's catalysts, enzymes are usually only active within the range of conditions, particularly pH, temperature, and aqueous solvents, found within the cells from which they are isolated. While the range of environmental conditions in which living organisms exist is quite broad, this presents a major distinction between enzymes and other chemical catalysts, such as charcoal and platinum, which often require much higher temperatures and more extreme pH conditions than most enzymes. For a more detailed discussion of the properties of enzymes, see LODISH, ET AL., MOLECULAR CELL BIOLOGY, 75–86 (3d ed. 1995).

It has been reported in the literature that enzymes can be used to degrade drilling fluid residues. For example, Hanssen, et al., "New Enzyme Process for Downhole Cleanup of Reservoir Drilling Filter cake" SPE 50709 (1999) describes experimental work towards the use of enzymes for downhole cleanup of filter cakes produced by water-based drilling fluids. These experiments focused on filter cakes containing modified starch and xanthan, applying thermostable α-amylases, and polyanionic cellulose (PAC)-based fluids using cellulase enzymes. As reported, these enzymes are shown to be highly effective in degrading starch/xanthan and PAC/xanthan water-based drilling fluids and their filter cakes in the laboratory.

Hanssen, et al., disclosed the properties of several enzymes and filter cake components as follows:

All starches are mixtures of amylose, a linear polysaccharide, and the related but branched amylopectin, in a ratio dependent on its natural source (corn, potatoes, and other crops). Molecular weight also varies with the source, but is typically very high: $10^5$–$10^9$ corresponding to approx. 500–5000 monomer units. Chemically modified starches may have hydroxyethyl or hydroxypropyl side-chain substituents on an unchanged backbone. Modified and crosslinked starches may be as large as $30\mu$ in size.

An α-amylase enzyme is reported to hydrolyze the α-1,4 glycosidic bonds characteristic of the starch backbone to water-soluble oligosaccharides of 2 to 10 sugar units. It is indicated that the reaction occurs by attachment of the active site in the enzyme to an α-1,4 bond in the polymer molecule where hydrolysis can occur, forming an enzyme-substrate complex, followed by "clipping" of the bond. This reaction continues on and on again, causing the degradation of the polymer chain. These enzymes typically have molecular weights on the order of 25–75,000 and diameters of 5–10 nm. Hence, amylases are smaller than the polysaccharides they destroy, but have a very different shape.

Cellulase enzymes are similarly reported as specific for the bonds in cellulose polymers. Here the β-(1,4) bonds characteristic of this polysaccharide are broken down. Carboxymethyl celluloses (CMC's) and polyanionic celluloses (PAC's) in general, with hydrophilic side chains, were also degraded by the celluloses reported in the Hanssen, et al., study.

In addition to their conclusions as to the potential of enzymes in oil production, Hanssen, et al., disclosed two experimental methods which allow for rapid, repeatable and consistent selection and development of enzyme products for application in the field, including (1) a visual filter cake degradation test for screening of treatment fluid, and (2) filtration tests for quantitative evaluation of enzyme activity.

Others have also described the useful properties of enzymes. U.S. Pat. No. 5,126,051, and U.S. Pat. No. 5,165,477, both of which are incorporated herein by reference, disclose the use of enzymes for (1) cleaning up a well site drilling mud pit containing drilling mud comprising polymeric organic viscosifiers; and (2) removing used drilling mud comprising a polymeric organic viscosifier from a wellbore. In the downhole application of this invention, a fluid comprising one or more enzymes capable of rapidly degrading the polymeric organic component of the drilling fluid is injected into the well. The enzymes degrade the organic polymeric viscosifier, allowing the drilling fluid residues to disperse within a wash fluid, which can then be recovered from the well. As disclosed, the enzymes contained within the fluid wash must rapidly decompose the drilling mud in contact with the wellbore before they are rendered inactive by harsh downhole conditions. As reported, laboratory tests conducted using five different enzymes illustrated that enzymes can be effectively used at low concentrations to rapidly degrade polymeric organic viscosifiers of the type used in drilling muds.

Further, U.S. Pat. No. 5,247,995 ("the '995 patent"), incorporated herein by reference, discloses a method of degrading damaging polysaccharide-containing filter cakes, produced from fracturing fluids, and other damaging fluids using enzymes specific to those polysaccharides. The method consists of pumping an enzyme treatment to a desired location within the well bore to coat the filter cake, degrading the polysaccharide containing filter cake, and removing the degraded filter cake, thus increasing the permeability of the formation.

Specifically, the '995 patent describes suitable hydratable polysaccharides such as the galactomannan gums, guars, derivatized guars, cellulose and cellulose derivatives. Specific examples disclosed are guar gum, guar gum derivatives, locust bean gum, caraya gum, xanthan gum, cellulose, and cellulose derivatives. Further, the invention of the '995 patent describes various other suitable polysaccharides used in the oil industry, such as starch and starch derivatives, which thicken fluids and control fluid loss.

The method of the '995 patent for treating guar-containing filter cakes comprises using enzymes that are hydrolases. As reported, the enzyme hydrolases are stable in the pH range of about 2,0 to 11.0 and remain active at both acid and alkaline pH ranges of about 2.0 to 10.0. These same enzymes were reported as active at low to moderate temperatures of about 50° F. to about 195° F. As disclosed, for the preferred method of the '995 patent, the pH range is 3 to 7 at a temperature range of about 80° F. to 195° F. At temperatures of above about 125° F., the preferable pH ranges from about 3 to 5.

As disclosed, the enzymes are specific to attack the mannosidic and galactomannosidic linkages in the guar residue, breaking the molecules into monosaccharide and disaccharide fragments. Under some conditions, these enzymes hydrolyze the residue completely into monosaccharide fragments. The preferred enzymes for the guar-containing filter cake are galactomannan hydrolases collectively called galactomannanase and they specifically hydrolyze the (1,6)-α-D-galactomannosidic and the (1,4)-β-D-mannosidic linkages between the monosaccharide units in the guar-containing filter cake respectively.

The method of the '995 patent also consists of removing cellulose-containing filter cakes using hydrolase enzymes which differ from the enzymes for the guar-containing filter cake. As reported, these enzymes are active in the pH range of about 1.0 to 8.0. The preferred pH range is about 3.0 to 5.0. These same enzymes are active at low to moderate temperatures of about 50° F. to 140° F. Most preferably for the method of the invention, the pH is about 3.5 to 4.0.

As disclosed by the '995 patent, with a cellulose or derivatized cellulose containing filter cake, the specific enzymes attack the glucosidic linkages of the cellulose backbone, breaking the backbone into fragments. Insoluble cellulose is composed of repeating units of D-glucose joined by (1,4)-β-glucosidic linkages. The fragments are broken down into soluble D-glucose monosaccharides. The preferred enzymes are any enzymes or combination of enzymes that attack the glucosidic linkages of the cellulose polymer backbone and degrade the polymer into mostly monosaccharide units, such as cellulase, nonspecific hemicelluases, glucosidase, endoxylanase, exo-xylanase and the like. The two preferred enzymes are commonly called exo and endo xylanases. The preferred enzymes for this cellulose based system specifically hydrolyze the exo(1,4)-β-D-glucosidic and the endo(1,4)-β-D-glucosidic linkages between the monosaccharide units in the cellulose backbone and the (1,4)-β-D-glucosidic linkage of any cellobiose fragments.

Further, the method of the '995 patent for removing starch derived filter cake consists of using enzymes that are specific for the linkages found within the starch molecule. These enzymes are active at the pH range of between about 2.0 to 10.0 for the temperature range of about 50° F. to 230° F.

As described, starch, like cellulose, is a polysaccharide formed of repeating units of D-glucose. However, the glucose molecules are joined in an (1,4)-α-glucosidic linkage rather than the (1,4)-β-glucosidic linkage found in cellulose. Starch contains a mixture of two polymers, amylose and amylopectin. Amylose consists of a linear chain of D-glucose molecules bound in α-D-(1–4) linkages. Amylopectin, the major component of the starch polysaccharide, is a highly branched D-glucan with a backbone of D-glucose α-D-(1–4) linkages and D-glucose side chains connected by α-D-(1–6) linkages. To reduce the viscosity of starch residue, such as filter cake, the preferred enzymes digest the starch molecules until no starch is present as determined by iodine testing. The enzymes reduce the starch into smaller units, most likely oligosaccharide units and dextrin. This degradation sufficiently decreases the size of the starch polymer so as to make it soluble, removing it as component in the filter cake. The smaller polysaccharides do not damage the formation and often terminally degrade at higher temperatures. These enzymes or combination of enzymes are selected from the endo-amylases, exo-amylases, isoamylases, glucosidases, α-glucosidases, glucan (1,4)-α-glucosidase, glucan (1,6)-(α-glucosidase, oligo-(1,6)-glucosidase, α-glucosidase, α-dextrin endo-(1, 6)-α-glucosidase, amylo-(1,6)-glucosidase, glucan (1,4)-α-maltotetrahydralase, glucan (1,6)-α-isomaltosidase, glucan (1,4)-α-maltohexaosidase, and the like.

As disclosed, the preferred enzymes are endo-amylases. The endo-amylases randomly attack the internal α-glucosidic linkages. There is no preferable type of endo-amylase, as the specific endo-amylase selected varies on the conditions present in the formation, such as pH and temperature.

Further, as disclosed, the enzyme treatment for cellulose-containing polysaccharides can be adapted for other polysaccharides with the cellulose backbone and side chains. The treatment may require additional enzymes to break the side chain linkages before effective degradation of the backbone occurs. These enzymes are hydrolases specific to the linkages of the side chains.

One example disclosed in the '995 patent of this type of polysaccharide is xanthan. Enzyme treatment specific for the xanthan polysaccharide reduces the static viscosity of the xanthan. As described, the enzyme treatment works at a pH range between about 2.0 and 10.0 at temperatures ranging from about 50° F. to 150° F.

As described in the '995 patent, xanthan gums are cellulose-containing, heteropolysaccharides. Xanthans contain a cellulose backbone of (1,4)-β-D-glucosidic linkages and trisaccharide side chains on alternate residues. The trisaccharide side chains may consist of glucuronic acid, pyruvated mannose, mannose, and/or acetylated mannose. The method of the '995 patent uses hydrolases which can break down the (1,4)-β-D-glucosidic linkages within the cellulose backbone. The cellulose backbone, however, can only be broken after treating the xanthan to degrade the trisacchanrde side chains with another enzyme such as a mannosidase. The treatment therefore requires at least two enzymes. The enzyme treatment uses the same enzymes described above for cellulose-containing filter cakes and mannosidase or mannan (1,2)-β-D-mannosidase, although no particular enzymes or concentration of enzymes are currently preferred. The xanthan gum reduces to smaller polysaccharide molecules, probably the smallest is a tetrasaccharide. The degradation decreases the static viscosity of the xanthan polysaccharide for easy removal. The pH depends on the activity range of the selected enzymes nd the conditions found within the formation.

Further, U.S. Pat. No. 5,566,759, incorporated herein by reference, discloses a mechanism for degrading cellulose-containing fluids used during fracturing, workover and completion operations to produce an efficacious degradation of a cellulose-containing fluid at an alkaline pH range and higher temperatures than were disclosed in the '995 patent, illustrating that systems can be designed for the use of enzymes which operate outside previously determined ranges of enzyme activity.

Methods of enzyme inactivation and encapsulation have been reported in the context of well stimulation and fracturing fluids.

Hydraulic fracturing is a conventional practice for producing one or more cracks or "fractures" in a formation by applying sufficient pressure via a fracturing fluid to cause the mechanical breakdown of a formation. The fracturing process is meant to increase the permeability or conductivity of the formation, and ultimately, well productivity. Fracturing fluids are usually a highly viscous gel emulsion or foam, suspended in which is a proppant, such as sand or other particulate matter. The high-viscosity of the fluid is important, generating larger fracture volume and fracture width, and more efficiently transporting proppant material. The purpose of the proppant is to prevent the fracture from closing upon removal of pressure. Once the fracture has been established, it is desirable to remove the highly viscous fluid, allowing hydrocarbon production through the pores between the proppant in the newly formed fracture. To facilitate removal of the fluid, a "breaker," or viscosity-reducing agent, is employed. The typical breakers that are used in fracturing fluids are enzymes and oxidizers. Simply adding a breaker to the fluid, however, is problematic; results are often unreliable, and can lead to premature breaking of the fluid before the fracturing process is complete, resulting in a decrease in the number or length of fractures, and well productivity.

There have been a number of proposed methods for controlling the activity of breakers to alleviate the above problems. For example, U.S. Pat. No. 4,202,795, incorporated herein by reference, discloses a method in which a breaker is combined with a hydratable gelling agent, and a gel-degrading substance. The mixture is formed into pills or pellets, preferably having size and range of about 20 to about 40 mesh. (U.S. Sieve Series) After combining the pellets with an aqueous fluid into which the chemical is to be released, the gelling agent in the pellets hydrates and forms a protective gel around each of the pellets which prevents the release of the chemical into the aqueous fluid for the predetermined time period required for the protective gel to be removed by the gel-degrading substance in the pellets. The most serious problem associated with this system is that the breaker tends to be released over a significant period of time due to differences in the thickness of the protective coating and in variations of length of time and temperature exposure of the individual pellets. A large amount of hydratable gelling agent is typically required and the amount of hydratable gelling agent must be monitored closely.

U.S. Pat. No. 4,506,734, incorporated herein by reference, also provides a method for reducing the viscosity and the resulting residue of an aqueous or oil based fluid introduced into subterranean formation by introducing a viscosity-reducing chemical contained within hollow or porous, crushable and fragile beads along with a fluid, such as a hydraulic fracturing fluid, under pressure into the subterranean formation. When the fracturing fluid passes or leaks off into the formation, or the fluid is removed by back flowing, the resulting fractures in the subterranean formation close and crush the beads. The crushing of the beads then releases the viscosity-reducing chemical into the fluid. This process is dependent upon the closure pressure of the formation to obtain release of the breaker and is, thus, subject to varying results dependent upon the formation and its closure rate.

U.S. Pat. No. 4,741,401, incorporated herein by reference, discloses a method for breaking a fracturing fluid comprised of injecting into the subterranean formation a capsule comprising an enclosure member containing the breaker. The enclosure member is sufficiently permeable to at least one fluid existing in the subterranean environment or injected with the capsule such that the enclosure member is capable of rupturing upon sufficient exposure to the fluid, thereby releasing the breaker. The patent teaches that the breaker is released from the capsule by pressure generated within the enclosure member due solely to the fluid penetrating into the capsule whereby the increased pressure caused the capsule to rupture, i.e., destroys the integrity of the enclosure member, thus releasing the breaker. This method for release of the breaker would result in the release of substantially the total amount of breaker contained in the capsule at one particular point in time.

In another method to release a breaker, U.S. Pat. No. 4,770,796, incorporated herein by reference, teaches or suggests an acid fracturing fluid composition comprising a polymer, a crosslinking agent for said polymer, an aqueous acid and a breaker compound capable of coordinating with titanium or zirconium crosslinking agent. The breaker compound is encapsulated in a composition comprising a cellulosic material, a fatty acid, and, optionally, a wax.

Further, U.S. Pat. No. 4,919,209, incorporated herein by reference, discloses a proposed method for breaking a fracturing fluid. Specifically, the patent discloses a method for breaking a gelled oil fracturing fluid for treating a subterranean formation which comprises injecting into the formation a breaker capsule comprising an enclosure member enveloping a breaker. The enclosure member is sufficiently permeable to at least one fluid existing in the formation or in the gelled oil fracturing fluid injected with the breaker capsule, such that the enclosure member is capable of dissolving or eroding off upon sufficient exposure to the fluid, thereby releasing the breaker.

U.S. Pat. No. 5,102,558, incorporated herein by reference, discloses an encapsulated breaker chemical composition for use in a fracturing process. The capsule is described as a pinhole free coating of a neutralized sulfonated elastomeric polymer having a preferred thickness of about 2 to 80 microns deposited on the surface of a breaker chemical. The neutralized sulfonated polymer is not degraded by the breaker chemical, and is permeable to the breaker chemical at conditions of use.

U.S. Pat. No. 5,102,559, incorporated herein by reference, improves upon the neutralized sulfonated polymer capsule of U.S. Pat. No. 5,102,558 by first coating the breaker with a water soluble sealing layer, such as urea, such that the breaker is protected from aging and is prevented from degrading the polymer coating. Further, the seal shields the chemical from premature release by creating a barrier to water soluble fluid components.

Similarly, U.S. Pat. No. 5,110,486, incorporated herein by reference, describes an encapsulated breaker composition comprising a breaker chemical encapsulated by a pinhole free coating of an ionically and covalently crosslinked neutralized sulfonated elastomeric polymer. Again, the polymer is permeable to the breaker, which is non-reactive to the polymer.

U.S. Pat. No. 5,164,099, incorporated herein by reference, discloses a proposed method for breaking a fluid utilizing a percarbonate, perchlorate or persulfate breaker encapsulated with a polyamide. The polyamide membrane is permeable to at least one fluid in the formation which dissolves the breaker and the breaker then diffuses through the membrane to break the fracturing fluid with the membrane staying intact during the breaker release. Thus providing a means of slowly releasing amounts of breaker over time instead of a single release of the total volume of the breaker from all capsules at a given time.

U.S. Pat. No. 5,373,901, incorporated herein by reference, discloses a method of encapsulating a breaker within a membrane comprising a partially hydrolyzed acrylic crosslinked with either an aziridine prepolymer or a carbodiimide. The membrane has imperfections through which the breaker can diffuse upon contact with an aqueous fluid. The imperfections may be created by the incorporation of selected micron-sized particles in the membrane coating.

U.S. Pat. No. 5,437,331, incorporated herein by reference, discloses a polymeric particle or bead having a network of pores with an enzyme breaker held protectively within the network to provide a controlled time release of the enzyme. The invention is described as having increased mechanical stability over previous micro-encapsulated or gel delivery vehicles, which renders this delivery system capable of being manufactured, processed, handled, and applied under more severe conditions, such as mechanical pumping.

U.S. Pat. No. 5,580,844, incorporated herein by reference, provides a coated breaker chemical, in which the coating comprises a blend of neutralized sulfonated ionomer and asphalt. Such coatings were shown to be useful because of their water barrier properties, their elasticity, and ability to be applied as thin continuous coatings substantially free of pinholes. The patent describes the capability of this encapsulation to include enzyme breakers, and to provide controlled release of the breaker over a period of time under conditions of use.

U.S. Pat. No. 5,591,700, incorporated herein by reference, discloses a breaker encapsulated by a water soluble surfactant. The surfactants proposed are waxy materials that melt and/or dissolve into the fracturing fluids at temperatures in the subterranean formation to be fractured. The distinguishing feature of these surfactants is that they are solid at ambient surface conditions, while dissolving at temperatures within the formation.

Further, U.S. Pat. No. 5,604,186, incorporated herein by reference, describes an enzyme solution coated substrate covered with a membrane comprising a partially hydrolyzed acrylic crosslinked with either an azidirine prepolymer or carbodiimide. The membrane contains imperfections through which an aqueous fluid may pass into the breaker to contact the enzyme and diffuse the enzyme outward from the breaker particle.

U.S. Pat. No. 5,948,735, incorporated herein by reference, discloses an encapsulated breaker for use in oil-based fracturing fluids. The invention describes a solid particle breaker chemical coated with an oil degradable rubber coating, which is introduced into an oil-based fracturing fluid, which exhibits a delayed release of the active chemical.

As described in the previously-mentioned patents, certain types of encapsulation can be useful to inactivate a breaker until such time, or under such conditions, as the chemical activity is needed to decrease viscosity of the fracturing fluid. As described in U.S. Pat. No. 5,806,597, encapsulation has its limitations. For instance, premature release of the enzyme payload sometimes occurs due to product manufacturing defects, imperfections, or coating damage experienced in pumping the particles through surface equipment tubular and perforations.

U.S. Pat. No. 5,806,597 ("the '597 patent"), incorporated herein by reference, proposes that rather than encapsulate the breaker, a complex containing the breaker is maintained in a substantially unreactive state by maintaining conditions of pH and temperature. The complex comprises a matrix of compounds, substantially all of which include a breaker component, a crosslinker component, and a polymer component. Once the fracture is completed, conditions are changed, the complex becomes active, and the breaker begins to catalyze polymer degradation.

Further, the '597 patent discloses that the preferred breaker components are polymer specific enzymes. These enzymes are particularly advantageous in that they will attach to a strand of the polymer, although inactive, and bind or stay attached to that polymer until such time as conditions are appropriate for the reaction to occur. The enzyme will migrate with the substrate, such that it will be dispersed within the fluid where it is needed.

The underlying basis of this method of control is better explained by considering conventional enzyme pathways which may be described by the following reaction: $E+S \therefore [ES] \therefore E+P$, in which E is an enzyme, S is a substrate, [ES] is an intermediate enzyme-substrate complex and P is the product of the substrate degradation catalyzed by the enzyme. The reaction rate of the intermediate enzyme-substrate complex is pH dependent and may be slowed or even virtually halted by controlling the pH and temperature of the enzyme substrate complex. Further explanation of this process may be found in MALCOM DIXON & EDWIN C. WEBB, ENZYMES 162 (1979).

Although the literature reflects a great deal of effort directed at controlling the activity of fracturing fluid breakers, most of those methods are limited in their usefulness by unfavorable downhole conditions or by economic factors. Particularly lacking in the field are adequate ways of avoiding the problems associated with drilling fluids, which must undergo high shear while drilling, cycling of temperature between bottom-hole and surface, and remain useable for weeks. Once drilling stops, the residues, or filter cakes remaining in the well, that inhibit drilling operations or damage producing formations, must be destroyed, sometimes at an indeterminate time after drilling. Still needed are better ways of providing a functional agent, such as an enzyme or a chemical, that can withstand the rigors of drilling, be deliverable to a specified downhole location and of obtaining a desired or selective activity to accomplish the decomposition of a polymeric viscosifier, or other substrate. Also needed are better ways of controlling the release or activity of an enzyme, chemical or other functional agent in order to alter the physical or chemical properties of a polymeric component of an oil field fluid or residue. Moreover, suitable physically robust particles that respond to a trigger to release an enzyme or otherwise reactive substance that has been held inactive would have a number of applications. Such particles could also lend themselves to solving the more general problems of building in countermeasures to fluid contamination, selectable degradation of solid materials within and without the well bore, and facilitation of waste management of materials containing degradable polymers.

SUMMARY OF THE INVENTION

The present invention solves many of the problems encountered in the hydrocarbon exploitation industry. The inventors have developed active, and particularly catalytic, agents that can be made inert and remain inert under shear, temperature and prolonged exposure and that can be safely added to materials which would otherwise quickly change physical or chemical properties in their presence. Yet those inert agents become active to make those changes in response to a stimulus or trigger delivered either by direct action or the action of environmental agents made accessible over time or as a result of some indirect change such as reversal of pressure differentials or discharge into the environment. The agent, such as an enzyme or radical initiator, once activated is able to reverse physical or chemical properties (e.g., breaking the seal of an impermeable filter cake to release gas and oil or converting a mechanically strong material into innocuous fragments) has wide applications to the problems of building in countermeasures to fluid contamination, selectable degradation of solid materials within and without the well bore, and facilitation of waste management of materials containing degradable materials.

Accordingly, certain embodiments of the invention are directed to methods and related compositions for altering the physical and/or chemical properties of substrates used in hydrocarbon exploitation, in both downhole and in surface applications. These compositions and methods will find use in a variety of drilling, completion, workover, production, reclamation and disposal operations. The more preferred embodiments include the triggered release of agents, such as enzymes and chemicals that specifically act on defined substrates, such as polymeric viscosifiers, fluid loss control agents and chemical contaminants like $H_2S$. Creating a new drilling fluid formulation, including an enzyme within the circulating fluid system could provide for easy decomposition of the drilling fluid at the end of drilling operations, both in the fluid returned to tanks on the surface and the fluid lost to the formation or discharged whole or on cuttings into the environment. In certain of the new reservoir drilling fluid compositions, the encapsulated enzyme retains the enzyme during drilling operations and releases the enzyme or enzymes upon receipt of a chemical trigger such as pH or salinity change, or the enzyme is released over a defined period of time. An important trigger has been found to be $CO_2$, which is present in many reservoirs.

In accordance with certain embodiments of the present invention, a method of degrading a predetermined substrate is provided. The method includes formulating a fluid or a solid material containing a degradable substrate and an inactivated substrate-degrading agent, the inactivated agent being responsive to a predetermined triggering signal such that the agent becomes activated upon exposure to the triggering signal. The activated agent is capable of degrading the substrate under degradation promoting conditions to change its physical or chemical properties. In some embodiments the step of applying a triggering signal comprises exposing the inactivated degrading agent to a stimulus selected from the group consisting of exposure to a reducing agents, oxidizers, chelating agents, radical initiators, carbonic acid, ozone, chlorine, bromine, peroxide, electric current, ultrasound, change in pH, change in salinity, change in ion concentration, change in temperature and change in pressure, the inactivated degrading agent being capable of physically and/or chemically responding to said stimulus.

In some embodiments the degrading agent comprises at least one enzyme having activity for degrading the substrate under degradation promoting conditions, and in some embodiments the substrate-degrading agent is encapsulated by an encapsulating material that is responsive to said triggering signal such that at least a portion of said enzyme is released by said encapsulating material upon exposure to a triggering signal. Certain embodiments include an encapsulating material formed of a co-polymer of (a) an ethylenically unsaturated hydrophobic monomer with (b) a free base monomer of the formula $$CH_2=CR^1COXR^2NR^3R^4$$

where R is hydrogen or methyl, $R^2$ is alkylene containing at least two carbon atoms, X is O or NH, $R^3$ is a hydrocarbon group containing at least 4 carbon atoms and $R^4$ is hydrogen or a hydrocarbon group. In certain embodiments $R^3$ is t-butyl and $R^4$ is hydrogen, and in certain embodiments $R^1$ is methyl, $R^2$ is ethylene and X is O. In some embodiments the hydrophobic monomer is a styrene or methylmethacrylate, and the encapsulating material is a co-polymer of styrene or methyl methacrylate with t-butyl amino ethyl methacrylate. In some embodiments the co-polymer comprises 55 to 80 weight % styrene, methyl styrene or methyl methacrylate with 20 to 45 weight % t-butylamino-ethyl methacrylate.

According to certain embodiments, the method also includes maintaining enzyme activity promoting conditions in a downhole environment, and, optionally, establishing enzymatic activity inhibiting conditions. In some embodiments the fluid or solid device comprises at least two inactivated enzymes, wherein the inactivated enzymes are capable of being reactivated by the same or different triggering signals, such that upon reactivation the reactivated enzymes are capable of acting upon the same or different substrates independently or in concert. In some embodiments the enzyme is selected from the group consisting of endo-amylases, exo-amylases, isomylases, glucosidases, amylo-glucosidases, malto-hydrolases, maltosidases, isomalto-hydro-lases and malto-hexaosidases. In some embodiments the reactivated enzyme is capable of being inactivated by application of a second triggering signal, wherein the second triggering signal may be the same or a different triggering signal, such that the inactivated enzyme no longer acts on the substrate.

Certain embodiments of the methods of the invention employ a degradable substrate selected from the group consisting of celluloses, derivatized celluloses, starches, derivatized starches, xanthans and derivatized xanthans. In certain embodiments the fluid is a circulating drilling fluid, completion fluid or workover fluid. In some embodiments the fluid is a stimulation fluid such as a fracturing fluid. In other embodiments the may include formulating a solid device comprises a self-destructing bridging particle containing a degradable substrate and a reactivatable inactivated enzyme for reversible fluid loss control. In some embodiments the method employs a solid device comprises degradable polymers and a reactivatable inactivated enzyme fashioned into hardware for use downhole or on the surface.

According to another embodiment, a method of increasing the flow of production fluid from a well is provided that comprises formulating a fluid comprising a degradable polymeric substrate and an inactivated enzyme. This method also includes introducing the fluid into a downhole environment and applying a triggering signal to the fluid. The triggering signal is sufficient to reactivate the inactivated enzyme to give a reactivated enzyme, and the reactivated enzyme is capable of selectively degrading the substrate sufficient to alter a physical property of the fluid such that the flow of production fluid is increased. In some embodiments the step of introducing the fluid into a downhole environment comprises forming a filter cake containing said degradable substrate and said inactivated enzyme. In some embodiments the fluid comprises more than one inactivated enzyme, wherein the inactivated enzymes are capable of being reactivated by the same or different triggering signals, wherein upon reactivation the reactivated enzymes are capable of acting upon the same or different substrates. In some embodiments the fluid is a circulating drilling fluid, a completion fluid, a workover fluid or a stimulation fluid. According to another embodiment, a method of increasing the flow of production fluid from a well is provided that comprises formulating a fluid comprising a degradable polymeric substrate and an inactivated enzyme. This method also includes introducing the fluid into a downhole environment, where the fluid is present as whole fluid, such as drilling fluid lost to natural fractures and other open features. The direct application of a physical, triggering signal, such as a change in pH with weak acids, is sufficient to reactivate the inactivated agent, such as an enzyme, to give a reactivated enzyme, and the reactivated enzyme is capable of selectively degrading the substrate sufficient to alter a physical property of the fluid as viscosity or particle suspending ability or pore-plugging ability such that the flow of production fluid is increased. Cementing and other activities that indirectly increase fluid production can also benefit by, for example, liquefaction and sloughing of drilling fluids left behind by imperfect cleaning of the well bore.

Carbon dioxide, present in many producing formations, has been shown to be an effective trigger for certain formulations. This provides for indirect delivery of the trigger by the reversal of pressure at the time of production. During drilling, completion, stimulation, and workover operations, the pressure is usually in the radially out direction, forcing fluids out from the wellbore and pushing formation fluids away form the borehole. Production begins with a reversal of the pressure differential, inducing formation fluids to flow into the well bore. Fluids inadvertently or purposefully left in the well bore become more exposed to the formation fluids, very often including $CO_2$. In contact with an aqueous phase, $CO_2$ reacts with water to form carbonic acid $H_2CO_3$, a mild acid, but sufficient to lower the pH of fluids to the bicarbonate buffer point determined by the environment.

Also provided by the present invention is a method of degrading filter cake. The method comprises formulating a fluid capable of making filter cakes and comprising a polymeric viscosifier or fluid loss control agent and an inactivated enzyme. An important example is a drilling fluid, where filter cake formation is an essential feature. The fluid is introduced into a downhole environment such that a filter cake containing the polymeric viscosifier or fluid loss control agent and the inactivated enzyme is formed. The fluid may be displaced from the well at that point, leaving the solid filter cake pressed into the surface of the well bore. A triggering signal is applied to the filter cake, the triggering signal being sufficient to reactivate the inactivated enzyme to give a reactivated enzyme. The reactivated enzyme is capable of selectively degrading the polymeric viscosifier or fluid loss control agent such that the filter cake at least partially disintegrates, allowing fluid to pass through the previously impermeable cake. $CO_2$ from the formation provides an especially useful route for decomposition of filler cakes where externally applied breakers such as concentrated mineral acids or oxidizers cannot be used, or where no external wash can be applied due to, for example, mechanical failure, preventing even application of the intended trigger signal.

Further provided by the present invention is a method of eliminating a contaminant from a drilling fluid or subterranean formation. According to certain embodiments, a fluid is formulated that comprises an inactivated contaminant-destroying agent. The method includes introducing the fluid into a downhole environment containing a predetermined contaminant that is a substrate capable of being degraded or destroyed by the agent under degradation promoting conditions, and then applying a triggering signal to the fluid. The optimal signal is the appearance of the contaminant, such as the lowering of pH by the introduction of hydrogen sulfide. The triggering signal then reactivates the inactivated agent to allow it to degrade the contaminant. As it often takes more than an hour for fluids to circulate from the bottom of a well to the top, and fluids are often left standing statically in the well, such a contaminant-triggered response provides for an automatic response, using materials that would otherwise be consumed by side reactions or destroy other fluid components if active in the fluid. The method may also include dislodging a piece of drilling equipment from an at least partially disintegrated filter cake.

Further provided by the present invention is a method of eliminating a contaminant from a drilling fluid or subterranean formation. According to certain embodiments, a fluid is formulated that comprises an inactivated substrate-degrading agent. The method includes introducing the fluid into a downhole environment containing a predetermined contaminant that is a substrate capable of being degraded by the agent under degradation promoting conditions, and then applying a triggering signal to the fluid. The triggering signal is sufficient to reactivate the inactivated agent to provide a reactivated agent. allowing the reactivated substrate-degrading agent to degrade the contaminant. The fluid may be, for example, a circulating drilling fluid, completion fluid or a workover fluid and, in certain embodiments the contaminant is $H_2S$.

Also provided in accordance with the present invention is a wellbore servicing composition comprising a fluid or a solid device containing at least one degradable substrate, said substrate contributing to the structural integrity of said device or to the structural integrity of a residue of said fluid, and an inactivated substrate-degrading agent. The substrate-degrading agent is capable of responding to a triggering signal such that the agent becomes at least partially reactivated sufficient to degrade said substrate under degradation promoting conditions in a downhole environment such that a physical or chemical property of the composition is altered. The utility of the invention in destroying solid filter cake formed in the wellbore and containing the inactivated agent can be extended to pre-formed solid materials. An example would be to make solid particles from starch and starch-containing synthetic polymers to serve a rigid bridging particles, for example, for use in low density fluids where the density of calcium carbonate cannot be tolerated, and strong chemicals cannot be used to clean up the filter cake, or where cleanup chemicals may not be able to be applied. Another application could be to cash sheets of degradable polymer containing the inactivated agent for use as cover for premium screens such as prepacked sand screens. The covers could prevent damage of the screens whilst being placed into the wellbore, and then destroyed by application of the trigger or exposure to $CO_2$ from the well.

Still further provided in accordance with the invention is a wellbore treatment method comprising formulating a fluid comprising an encapsulated substrate-degrading agent; introducing the fluid into a downhole environment containing a predetermined substrate capable of being degraded by the agent under degradation promoting conditions; and providing for generation of the trigger upon reaching the desire point. One example would be the use of encapsulation to preserve the activity of the agent that would normally be lost during the trip to the site of use, say by thermal degradation of enzymes in a brine pumped to the producing zone at the bottom of a deep, hot well. Including materials that generate a trigger as they thermally degrade would provide for the preserved agent to be released where it could immediately act.

Also provided by the present invention is a composition for use in hydrocarbon exploitation operations. The composition can be, for example, a circulating drilling fluid, a completion fluid, a workover fluid, a bridging particle and a solid hardware device. In certain embodiments the composition comprises a fluid or a solid device containing at least one degradable substrate and an encapsulated substrate-degrading agent. The encapsulated agent is capable of responding to a triggering signal such that the agent becomes sufficiently unencapsulated to allow the agent to degrade the substrate under degradation promoting conditions such that a physical or chemical property of the substrate is altered. In some embodiments the encapsulated substrate-degrading agent is inactivated by encapsulation in a material that is capable of responding to the triggering signal by making the degrading agent available to the degradable substrate. In certain embodiments the triggering signal includes a change in pH of a medium contacting the encapsulated agent. The substrate degrading agent may comprise at least one inactivated enzyme, wherein the inactivated enzymes are capable of being reactivated by the same or different triggering signals, wherein upon reactivation the reactivated enzymes are capable of acting independently or in concert upon the same or different substrates. In some embodiments the substrate is selected from the group consisting of celluloses, derivatized celluloses, starches, derivatized starches, xanthans, and derivatized xanthans. In some embodiments the substrate contributes to the structural integrity of the device or to the structural integrity of a residue of the fluid such that degradation of a substrate causes a physical change in the composition. For instance, the disintegration of a filter cake. In some embodiments the enzyme is an endo-amylase, exo-amylase, isomylase, glucosidase, amylo-glucosidase, malto-hydrolase, maltosidase, isomalto-hydro-lase or malto-hexaosidase.

In certain embodiments, the triggering signal comprises exposure to a reducing agent, oxidizer, chelating agent, radical initiator, carbonic acid, ozone, chlorine, bromine, peroxide, electric current, ultrasound, change in pH, change in salinity, change in ion concentration, change in temperature and change in pressure, or a combination of such stimuli.

In some composition embodiments the encapsulated agent comprises an encapsulation material formed of a co-polymer of (a) an ethylenically unsaturated hydrophobic monomer with (b) a free base monomer of the formula $$CH_2=CR^1COXR^2NR^3R^4$$

where R is hydrogen or methyl, $R^2$ is alkylene containing at least two carbon atoms, X is O or NH, $R^3$ is a hydrocarbon group containing at least 4 carbon atoms and $R^4$ is hydrogen or a hydrocarbon group. For example, the encapsulating material may be a co-polymer of styrene or methyl methacrylate with t-butyl amino ethyl methacrylate.

These and other features of the present invention are more fully set forth in the description of illustrative embodiments of the invention with reference to the following drawings.

BRIEF DESCRIPTION OF THE DRAWINGS

The description is presented with reference to the accompanying drawings in which.

DETAILED DESCRIPTION OF PREFERRED EMBODIMENTS

Figure 1:
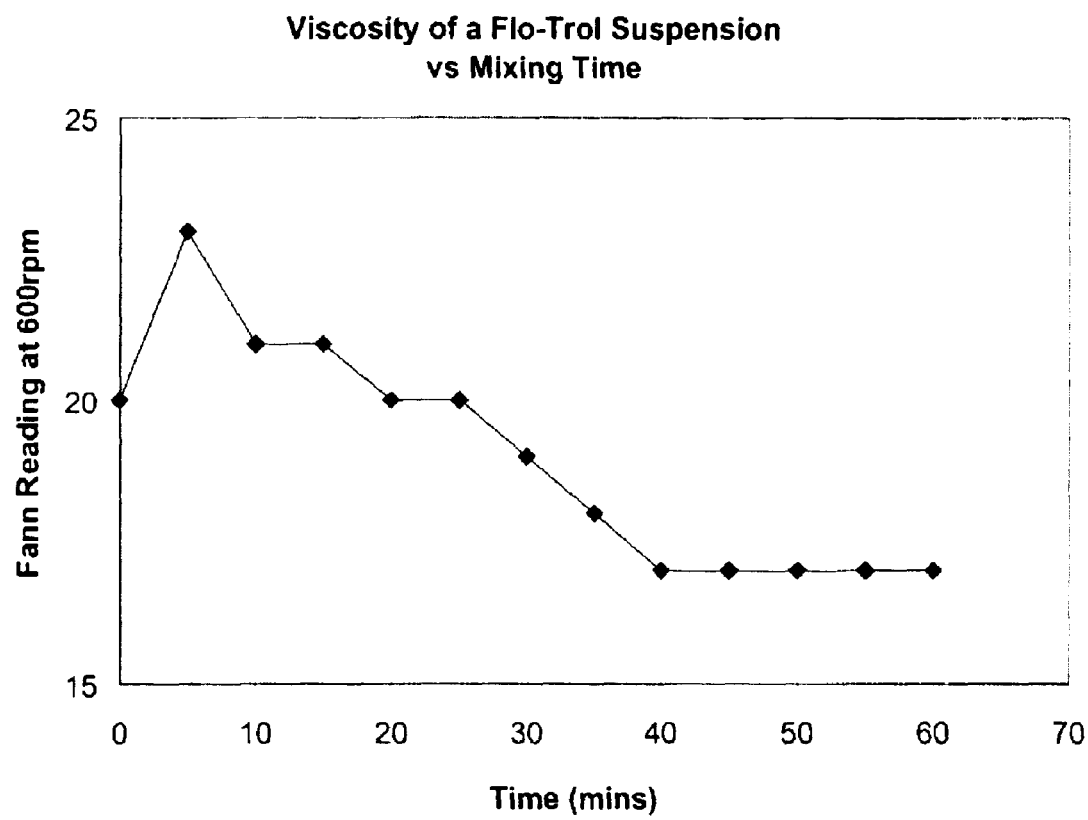
FIG. 1 is a graph of representative data comparing the Starch (Flo-Trol) Suspension Viscosity with mixing time.

New methods, compositions and devices have been developed that are suitable for use with oil field fluids, circulating fluids and solid articles employed in the drilling, completion, workover, stimulation, production, reclamation or disposal operations in oil and gas wells.

Drilling Fluids Containing an Inactivated or Encapsulated Enzyme

Some of the more preferred compositions are useful for inclusion in a circulating drilling fluid or mud system. These compositions contain inactivated enzymes that are capable of being activated or reactivated by a chemical or physical signal or by a change in drilling fluid conditions. The enzymes remain inactive until such time as a change in the properties of the drilling fluid is desired. The enzyme is then activated upon exposure to a chemical or physical signal, or a change in the drilling fluid environment, such as a decrease in pH or temperature. Upon activation, such enzymes are capable of selectively degrading fluid components remaining within the well bore, such as filter cakes or other damaging material that may form during drilling operations. Additional changes in the drilling fluid environment may serve to regulate enzyme activity. By controlling the activity of enzymes contained within the circulating drilling fluid system, several drilling problems associated with drilling fluid formations may be avoided, thus increasing well productivity.

As used herein and in the appended claims, "circulating drilling fluid system" means a system in which the drilling fluid is circulated through the well for the purposes of drilling. The composition of the drilling fluid, therefore, should be tailored to fulfill the traditional roles of drilling fluids as described in H. C. H. DARLEY & GEORGE R. GRAY, COMPOSITION AND PROPERTIES OF DRILLING AND COMPLETION FLUIDS ($5^{th}$ ed. 1988), in addition to functioning in accordance with present invention. It should be understood by those skilled in the art, however, that the method of using deactivated enzymes in the present invention is not limited to circulating drilling fluid systems, but can be used in downhole applications, other than those involving active drilling, whenever it is desirable to control fluid loss to the surrounding formation, such as during the placement of well completion equipment or reintroduction of fluid into porous formations.

Just as the composition of the drilling fluid must be carefully composed to meet the individual requirements of a specific drilling operation, the type of enzymes selected, and method of inactivation, is dependent upon the nature of polymeric additives, and the whole of conditions expected within the well bore. A wide variety of enzymes have been identified and separately classified according to their characteristics. A detailed description and classification of known enzymes is provided in the reference entitled ENZYME NOMENCLATURE (1984): RECOMMENDATIONS OF THE NOMENCLATURE COMMITTEE OF THE INTERNATIONAL UNION OF BIOCHEMISTRY ON THE NOMENCLATURE AND CLASSIFICATION OF ENZYME-CATALYSED REACTIONS (Academic Press 1984) [hereinafter referred to as "Enzyme Nomenclature (1984)"], the disclosure of which is fully incorporated by reference herein. According to Enzyme Nomenclature (1984), enzymes can be divided into six classes, namely (1) Oxidoreductases, (2) Transferases, (3) Hydrolases, (4) Lyases, (5) Isomerases, and (6) Ligases. Each class is further divided into subclasses by action, etc. Although each class may include one or more enzymes that will degrade one or more polymeric additives present in drilling mud, the classes of enzymes in accordance with Enzyme Nomenclature (1984) most useful in the methods of the present invention are (3) Hydrolases, (4) Lyases, (2) Transferases, and (1) Oxidoreductases. Of the above, classes (3) and (4) are the most applicable to the present invention.

Examples of enzymes within classes (1)-(4) according to Enzyme Nomenclature (1984) for use in accordance with the methods of the present invention are described in Table I below:

TABLE I

Class (3) Hydrolases (enzymes functioning to catalyze the hydrolytic cleavage of various bonds including the bonds C–O, C–N, and C–C)

3.1 - Enzymes Acting on Ester Bonds 3.1.3 - Phosphoric monoester hydrolases
3.2 - Glycosidases 3.2.1.1 - alpha-Amylase
3.2.1.2 - beta-Amylase
3.2.1.3 - Glucan 1,4-alpha-glucosidase
3.2.1.4 - Cellulase
3.2.1.11 - Dextranase
3.2.1.20 - alpha-Glucosidase
3.2.1.22 - alpha-Galactosidase
3.2.1.25 - beta-Mannosidase
3.2.1.48 - Sucrase
3.2.1.60 - Glucan 1,4-alpha-maltotetraohydrolase
3.2.1.70 - Glucan 1,6-alpha-glucosidase
3.4 - Enzymes Acting on Peptide Bonds (peptide hydrolases)

3.4.22 - Cysteine proteinases
3.4.22.2 - Papain
3.4.22.3 - Fecin
3.4.22.4 - Bromelin Class (4) Lyases (enzymes cleaving C—C, C—O, C—N and other bonds by means other than hydrolysis or oxidation)

4.1 - Carbon—carbon lyases
4.2 - Carbon—oxygen lyases
4.3 - Carbon—nitrogen lyases Class (2) Transferases (enzymes transferring a group, for example, a methyl group or a glyccosyl group, from one compound (donor) to another compound (acceptor)

2.1 - Transferring one-carbon groups 2.1.1 - Methyltransferases
2.4 - Glycosyltransferases 2.4.1.1 - Phosphorylase Class (1) Oxidoreductases (enzymes catalyzing oxidoreductions)

1.1 - Acting on the CH—OH group of donors 1.1.1.47 - glucose dehyogenase

The polymeric additive can be any of the polymeric additives familiar to those in the well service industry. For example, carboxymethylcellulose, hydroxyethylcellulose, guar, xanthan, glucans and starch. Table II below lists exemplary polymeric additives that may be present in drilling fluid residues and examples of corresponding enzymes capable of rapidly degrading such additives under reaction-promoting conditions.

TABLE II

Examples of Polymeric Organic Additives and Effective Enzymes for Rapidly Degrading the Same

| Common Oil-field Biological Polymers | Effective Enzymes(s) |
|---|---|
| Carboxy-methyl-cellulose and derivatives thereof | hemicellulase, cellulase, amyloglucosidase,α-amylase, β-amylase, glucan-(1,4)-α-glucosidase, glucan-(1,6)-α-glucosidase, cellulose-(1,4)-β-cellobiosidase |
| Hydroxy-ethyl cellulose (HEC) | hemicellulase, cellulase, amyloglucosidase, cellulose-(1,4)-β-cellobiosidase |
| Guar | hemicellulase, cellulase, amyloglucosidasecellulose-(1,4)-β-cellobiosidase |
| Xanthan | glucosidase, glucan-(1,4)-α-glucosidase, glucan-(1,6)-α-glucosidase, α-glucosidase |
| Glucans (including sclero-glucan | glucan-(1,4)-α-maltotetraohydrolase, glucan-(1,4)-α-glucosidase, cellulase, α-glucanase (such as ULTRA L from Novo Nordisk) |
| Starch and chemically modified starch | endoamylases, exo-amylases, isoamylases, glucosidases, α-glucosidases, glucan-(1,4)-α-glucosidase, glucan-(1,6)-α-glucosidase, oligo-(1,6)-glucosidase, α-glucosidase, α-dextrin endo-(1,6)-α-glucosidase, amylo-(1,6)-glucosidase, glucan-(1,4)-α-glucosidase, amylo-(1,6)-glucosidase, glucan (1,4)-α-maltotrahydralase, glucan-(1,6)-α-isomaltosidase, glucan-(1,4)-α-maltohexaosidase |

Enzyme Inactivation

Inactivation of the enzyme is preferably accomplished through a physical sequestration of the enzyme molecules, for example within a polymeric capsule impermeable to the enzyme. For example, the enzyme may be trapped in a functional polymer matrix that is pH sensitive, with the enzyme being released in response to high pH. Another example is the precipitation of an enzyme trapped within a semi-permeable nylon shell, and then disruption of the shell by high pH. Another example is directly coating a dry enzyme granule with a functional polymer directly. Yet another means of inactivating the enzyme is to utilize an enzyme that requires the addition of an activator molecule to initiate enzyme activity, or by the addition of an enzyme inhibitor. All such techniques may be utilized in preparing suitable inactivated enzymes. Preferably the enzyme is encapsulated by an acid- or alkaline-responsive material that is caused to release the enzyme in response to the appropriate pH change in the capsule surroundings. Various materials and techniques for encapsulating compounds and enzymes under conditions compatible with maintaining the activity of enzymes are disclosed in one or more of the following U.S. Patents assigned at issue to Ciba-Geigy Corporation; U.S. Pat. Nos. 5,837,290; 5,805,264; 5,310,721; 4,978,481; 4,968,532; 4,619,764; 4,003,846; 5,094,785 or in PCT publication WO 97/24178. The disclosures of these patents are incorporated herein by reference. Additional guidance for encapsulating compounds and enzymes under acceptable conditions is provided in one or more of the following U.S. Pat Nos. 5,492,646; 5,460,817; 5,194,263; 5,035,900; 5,324,445; 5,972,363; 5,972,387; 5,968,794; 5,965,121; 5,962,015; 5,955,503; 5,932,385; 5,916,790; 5,914,182; 5,908,623; and 5,895,757. The disclosures of these patents are incorporated herein by reference.

Inactivation of the enzyme is reversed upon exposure to a chemical or physical signal such as a change in the pH or by altering the salinity of the drilling environment. Alternatively the triggering agent may be a reducing agent, oxidizer, chelating agent, radical initiator, carbonic acid, ozone, chlorine, bromine, peroxide, electric current, or ultrasound; or alteration in the drilling fluid environment, such as a change ion concentration, temperature, or pressure. Preferably activation of the enzyme is accomplished, at least in part, by action of the triggering agent on the encapsulating material resulting in the release of the enzyme. In some cases it may be desirable to additionally regulate the enzymatic activity of the released enzyme by adjusting the pH, salinity or other environmental condition to provide activity-promoting conditions. It may be desirable in some situations to utilize a combination of signals and/or environmental changes; for example, to insure against premature activation. Once an enzyme is activated, the enzyme will catalyze reactions which alter the physical or chemical properties of the components of the fluid or solids as required to facilitate the drilling and/or oil recovery process. In some embodiments the enzyme can be deactivated upon exposure to an additional chemical or physical signal, or change in drilling fluid environment. For example, a required co-factor could be omitted from the circulating fluid or an enzyme inhibitor could be introduced via the circulating fluid to again inactivate the enzyme, or the pH could be raised or lowered beyond the working range of the enzyme. Such an option could be beneficial for controlling accidental enzyme release, or runaway enzyme activity at a downhole site.

In some situations, it may be advantageous to use a mixture of enzymes in connection with well drilling activities. Such enzymes may act in concert, accelerating the breakdown of drilling fluids by either facilitating enzyme activity, or operating on distinct substrates. For some applications it could be advantageous to allow enzymes which may counteract one another, be competitive, or otherwise negatively impact enzyme activity, to be included in the system, so long as they can be independently activated by distinct signals or changes in the drilling environment. For example, one enzyme might be activated at a high pH, while the other enzyme at a lower pH, at a higher temperature, or upon the addition of a cofactor.

Degradation of Filter Cake

A preferred use for the inactivated enzyme compositions is for the controlled degradation of a filter cake formed during well bore operations thus allowing increased permeability of drilling fluid residues and enhanced recovery of formation fluids. U.S. Pat. No. 5,165,477 ("the '477 patent") and U.S. Pat. No. 5,126,051 ("the '051 patent"), disclose the use of enzymes to degrade filter cakes by applying an external wash to the well bore. The enzymes within the fluid wash, selected to be effective against one or more drilling fluid components, catalyze the degradation of one or more biopolymers within the fluid. Both the '477 patent and the '051 patent disclose, however, that, to practice the invention, it is important to select only enzymes capable of rapidly degrading the polymeric additives in downhole applications because the harsh chemicals and conditions associated with drilling muds can permanently render the enzymes inactive by denaturing the protein. Use of muds containing inactivated enzymes constitutes a marked improvement over the use of a conventional enzyme wash to degrade filter cake and other downhole drilling fluid residues because the inactivated enzymes are incorporated into the filter cake and other fluid residues as they develop. This has the benefit of (1) placing the enzymes in contact with the substrate, (2) dispersing the enzyme in a more effective manner; and (3) protecting the enzymes from harsh downhole conditions and (4) providing for enzymatic degradation in areas that arc not reached by external wash. The result is believed to lead to a more effective and efficient removal of the filter cake.

A further difficulty with some enzyme washes of the prior art is that, for some enzymes to be effective in dissolving the filter cake, contact needs to be established by either the enzyme flowing into the filter cake by the help of liquid flow, or by self-diffusion of enzyme into the filter cake. Hanssen, et al., "New Enzyme Process for Downhole Cleanup of Reservoir Drilling Fluid Filtercake," SPE 50709 (1999). This raises some difficulties in that (1) the relatively large enzyme molecules may be slow to enter the tiny pores of a tight filter cake and diffuse through it; or (2) the enzymes may immobilize on the outside of the filter cake. In contrast, in the presently-described method it is the penetration of the cake by the trigger that initiates degradation by releasing the incorporated, inactivated enzymes. Thus, the enzymes do not have to work into the cake from the surface but rather are free to react with substrates throughout the filter cake or fluid.

Particle sizes of an inactivated enzyme are preferably formulated for the most effective distribution within the filter cake during its deposition. It can be expected the inactivated enzyme will be incorporated into both the external filter cake laid on the surface of the rock and the internal filter cake pushed into the pores of the rock, where at least some of the enzymes conventionally applied as an external wash will not reach. In many cases this will lead to faster, more effective removal of filter cake, and greater permeability of the formation.

Further, by being incorporated into the filter cake, the enzymes are provided protection from the harsh environment of the circulating mud system. The '477 patent indicates that there may be additional costs in the use of an external wash in that "it may be necessary to use a higher concentration of enzyme(s) to compensate for high temperature conditions" due to the thermal degradation of the enzyme activity during the high temperature transit to the target site. At some point, as the well is drilled deeper, conditions may become so severe that applying an enzyme wash through the drill string may require such high loadings so as to be impractical. In the present invention, however, the inactivated enzyme incorporated in the fluid is protected from degradation will have already been incorporated in the as well depth is increasing, thus obviating the need to later pass enzymes through deeper, more severe well environments. In addition, the encapsulated enzyme could be used to deliver an external wash under extreme conditions by putting it into a fluid with components that would generate the trigger under downhole conditions, thereby eliminating decomposition during the trip. In addition, certain enzyme inactivation methods, such as encapsulation, provide protection from the harsh conditions of the well bore and mechanical stress the enzymes will encounter in the drill bit and nozzles when circulated during drilling.

In most applications, the cost of the enzymes is an important consideration. Because of the protection provided by encapsulation and/or incorporation into the fluid residues, it is not necessary that enzyme selection be limited to those that act rapidly. In fact, some of the new compositions are expected to provide for greater enzyme survivability, and for a greater selection of potential enzyme candidates, some of which are likely to be more effective or less costly than those typically employed in enzyme washes.

Another cost-saving benefit of at least some of the new compositions is that, as a result of including the enzyme within the circulating drilling fluid system, the additional step of preparing and applying an enzymatic wash is obviated. While the same preliminary testing may be required in some cases to determine the most suitable enzyme and method of inactivation, applying an enzyme wash requires a greater expenditure of time and effort overall. By extending the range of enzymatic action, new drilling mud compositions are possible using materials heretofore difficult to break with enzymatic action.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Unless otherwise stated, all starting materials are commercially available and standard laboratory techniques and equipment are utilized.

General Materials and Methods

Equipment:
Hamilton Beach "Malt mixer"
Brookfield DV-II or DV-III Fann 35 viscometer
Standard calibrated Thermometer
1 L tall form beaker or beaker flask
Balance of technical quality or better
Stopwatch or similar timer
pH meter or similar means for determining pH
Silverson Mixer L4RT with general purpose disintegrating head
Materials:

| Tradename | Common Name | Supplier |
| --- | --- | --- |
| Flo-Trol | Chemically modified starch | M-I Drilling Fluids, Houston, TX |
| Dual-Trol | Chemically modified starch | M-I Drilling Fluids, Houston, TX |
| PROCARB | sized calcium carbonate | M-I Drilling Fluids, Houston, TX |
| BIOVIS | scleroglucan biopolymer | SKW Chemicals, Inc., Marietta, GA |
| SAFECIDE | biocide | M-I Drilling Fluids, Houston, TX |
| SAFE DFOAM | defoamer | M-I Drilling Fluids, Houston, TX |
| FLOVIS PLUS | xanthan biopolymer | M-I Drilling Fluids, Houston, TX |
| FAO-5 disk | ceramic disc | Fann Instrument Corporation, Houston, TX |
| NORPAR 13 | paraffin oil | Exxon Company, USA, Houston, TX |
| SAFE CARB F | finely ground calcium carbonate | M-I Drilling Fluids, Houston, TX |

Distilled or Deionized Water
HCl or NaOH or similar strong acid and base agents to adjust pH as needed

Stock Starch Suspension

The stock starch suspension is prepared fresh daily, to reduce the effects of adding biocide. Solids will settle. Mix thoroughly before each use. The recipe may be scaled up to produce larger quantities of starch slurry. Add 42 grams of Flo-Trol to 1 L of di-water in tall form beaker, or preferably 1 L beaker. (Note that iron affects enzyme action, so glass is preferred to stainless steel mixer cup). Stir at high speed with Hamilton Beach malt mixer or similar, for 15 minutes. Check pH, adjust to between 6 and 8 as required. Check rheology at about 70° F. If using the Brookfield apparatus, look for about 30% torque at 250 rpm using LV-2 spindle. If using a Fann 35 apparatus, look for a dial reading above 15 at 600 rpm with R1B1 set. Establish Baseline. Record viscosity at 5 minute intervals for one hour. Recheck viscosity after 24 hours, stirring sample to re-suspend starch.

Enzyme Solution

An enzyme such as one of those listed in Table I, above, is obtained as a solid or liquid solution and dissolved in an aqueous solution, optionally containing a preservative.

Encapsulated Enzymes

An enzyme solution is lyophilized and the resulting particles are encapsulated in a polymeric material as generally described in U.S. Pat. No. 5,492,646; 5,460,817 or 5,324,445, or in PCT publication WO 97/24178. In the present examples an ionophoric polymer that is more permeable to a selected enzyme at a defined acid pH than at a defined alkaline pH was preferred. Encapsulation polymers were obtained from Ciba Specialty Chemicals, United Kingdom. Preferably the encapsulating material is formed of a free base form of a cationic polymer which is a co-polymer of (a) an ethylenically unsaturated hydrophobic monomer with (b) a monomer of the formula $$CH_2=CR^1COXR^2NR^3R^4$$

where $R^1$ is hydrogen or methyl, X is O or NH, $R^2$ is alkylene containing at least two carbon atoms, $R^3$ is a hydrocarbon group containing at least 4 carbon atoms and $R^4$ is hydrogen or a hydrocarbon group.

The preferred monomers are those in which $R^3$ is tertiary butyl since the presence of the tertiary butyl group imposes particularly useful swelling properties on the polymer formed from that monomer. However $R^3$ may be other butyl or higher alkyl groups or it may be other hydra-carbon groups containing at least 4 carbon atoms (but usually not more than 8 carbon atoms). The t-butyl group is also advantageous because it seems to render the monomer units containing it more resistant to alkaline hydrolysis.

$R^4$ is frequently hydrogen but it can be alkyl such as methyl, ethyl or higher alkyl or it can be other hydro carbon group. The total number of carbon atoms in $R^3$ and $R^4$ together is usually below 12, often below 8.

$R^2$ is usually ethylene but it can be other linear or branched alkylene group containing two or more (for instance 2–4) carbon atoms.

$R^1$ is usually methyl.

X can be NH, with the result that the cationic monomer is preferably a monoalkyl or dialkyl aminoalkyl (meth) acrylamide monomer, but preferably X is O, with the result that the cationic monomer is preferably a monoalkyl or dialkyl aminoalkyl (meth) acrylate.

The hydrophobic monomer can be any ethylenically unsaturated monomer that is insoluble in water, for instance generally having a partition coefficient K between hexane and deionised water at 20° C. of at least 5 and preferably at least 10. The hydrophobic monomer can be a water-insoluble alkyl ester of methacrylic acid or other aliphatic, water-insoluble monomer such as methyl, ethyl or butyl acrylate or methacrylate. However the preferred hydrophobic monomers are ethylenically unsaturated aromatic hydrocarbon monomers, such as styrenes, preferably styrene or a methyl styrene or methyl methacrylate.

Generally the amount of cationic monomer will be within the range 5–30 mole % or 10–50 weight %. Best results are generally achieved with amounts of from around 12–25 mole % of the cationic free base monomer. When, as is preferred, the free base monomer is t-butylamino-ethyl methacrylate and the hydrophobic monomer is a styrene or methyl methacrylate, the amount of cationic monomer is preferably from 5%–50% by weight, most preferably around 5%–35% by weight.

The matrix can be formed of recurring units of monomers consisting solely of the hydrophobic monomer and the free base cationic monomer but if desired minor amounts of other monomers may be included.

The matrix is preferably formed by a method analogous to that which is described in EP 361677 or EP 356239, the disclosures of which are incorporated herein by reference, for the formation of a matrix of anionic polymer. Thus it may be made by dehydrating particles each of which is an oil-in-water emulsion of the free base polymer or it may be made by forming particles of a salt of the polymer with a volatile acid and evaporating the volatile acid during the drying so as to form the free base of the polymer.

The amount of cationic monomer groups in the form of salt, in the polymer, should be as small as possible and should be below 20 mole %, preferably below 10 mole % and most preferably below 5 mole % based on the amount of free base cationic monomer groups in the polymer. Preferably it is substantially zero. The preferred way of making the particles of polymeric matrix is by forming a reverse phase dispersion in a water immiscible non-aqueous liquid of droplets containing the chosen active ingredient and either an oil-in-water emulsion of the polymer or an aqueous solution of a salt of the polymer with a volatile acid and then distilling the dispersion so as to eliminate the water and, if necessary, to drive off the volatile acid. The formation of the reverse phase dispersion is preferably conducted in the presence of a polymeric (generally amphipathic) stabiliser and/or an emulsifier, for instance as described in EP 356239 and EP 361677 and WO 92/20771, the disclosures of which are incorporated herein by reference.

When, as is preferred, the matrix particles are made by providing a solution of a water soluble salt form of the polymer, this solution can be made by acidifying, using a volatile acid, an oil-in-water emulsion formed by oil-inwater emulsion polymerization of the monomers. Preferably, however, the solution is made by polymerizing the free base monomer and the hydrophobic monomer while dissolved in an organic solvent so as to form a solution of the free base polymer inorganic solvent. This is followed by addition of an aqueous solution of a volatile acid wherein the solvent has higher volatility than the acid. The solvent is then distilled off so as to leave a solution in water of the salt form of the polymer. A suitable volatile acid is acetic acid, in which event a suitable solvent is n-butylacetate.

In order to maximize the conversion of the salt form of the cationic polymer to the free base form, it is desirable to bake the product, after distilling off the water, at a temperature of at least 95° C. and usually 100° C. for at least 15 minutes and usually at least 20 or 30 minutes. Preferably this is conducted under sufficient vacuum (if necessary) to maximize the removal of volatile acid.

Enzyme Deviscosification Test

Check viscosity of stock solution is within 20% of original value. Spike 150 mL of sample with 0.10 mL of unencapsulated enzyme solution (scale the treatment level to sample size by ratio). Stir to completely mix sample. Measure rheology at 5 minute intervals for one hour. Observe initial viscosity increase followed by decrease to less than one half of starting viscosity at one hour. This demonstrates the susceptibility of the substrate to degradation by the selected enzyme at the treatment level applied.

Encapsulated Enzyme Test—Demonstration of Resistance Mild Shear

Pour out two samples of starch slurry, and blend in encapsulated enzymes to deliver the same enzyme activity as tested with unencapsulated enzyme into starch system as above, using Hamilton Beach mixer. Run Enzyme Deviscosification test. Recheck viscosity after 24 hours.

Encapsulated Enzyme Test—Demonstration of Release by pH

Blend in encapsulated enzymes into starch system as above, using Hamilton Beach mixer. Measure initial viscosity, adjust pH to release enzyme, and measure viscosity as per Enzyme Deviscosification test.

Encapsulated Enzyme Test—Demonstration of Resistance to High Shear

Blend in encapsulated enzyme into starch system as above, using a Hamilton Beach mixer. Apply shear of 8000 rpm using Silverson L4RT with general purpose disintegrating head and standard square hole screen for 90 s/L of fluid. Run Enzyme Deviscosification test and recheck viscosity after 24 hours, yield enzyme. Run Enzyme Deviscosification test.

High Shear/Hot Roll/High Shear Simulation of Fluid Circulation

Apply high shear to a encapsulated enzyme-containing fluid. Run the Enzyme Deviscosification test. "Hot Roll" at 150° F. for 16 hours (This can be done by placing the sample in a bottle and putting it into an oven equipped with rollers that continuously turn the bottle.) A shaker bath would serve as an approximation. RB flask/heating mantle would NOT work.) Run the Enzyme Deviscosification test, re-apply high shear, run the Enzyme Deviscosification test, yield enzyme, and run the Enzyme Deviscosification test.

By following the foregoing protocols, one can determine the appropriate polymeric additive (enzyme substrate), enzyme, enzyme activity, encapsulating material and conditions for enzyme activation necessary for use of the enzyme in the methods of present invention. The systematic variation of conditions will also readily permit one of ordinary skill in the art to find an enzyme and polymeric additive that will function in the formation of downhole filter cake and also allow the controlled degradation or removal of the filter cake under preselected conditions. Preferably the encapsulated enzyme particles are no larger than about 74$\mu$ in diameter, remain unaggregated when combined with the other drilling fluid components and are capable of withstanding the shear forces generated during drilling, particularly the shear forces generated by the mud pump and transiting the bit jets. It is also preferred that the inactivated or encapsulated enzyme control enzyme release or activity during dynamic exposure to drilling temperatures up to at least about 130° F., and preferably up to about 200° F., yet releases the enzyme or enzymes when triggered. For use as a reservoir drilling fluid, it is preferred that the encapsulated enzyme retain the enzyme during drilling operations and release the enzyme or enzymes upon receipt of a chemical trigger such as pH or salinity change, or over a defined period of time.

EXAMPLE 1

Employing the above-described procedures, the inventors have developed an encapsulated starch-degrading enzyme that is inactive at pH 10 and higher but releases active enzyme at pH 8 and lower. A choice was made among several alpha-amylases offered by Novo-Nordisk Pharmaceutical Company, selecting one that has the highest activity at the temperature and pH expected to be encountered for the present examples. The enzyme solution was then lyophilized to remove water and made suitable for the application of an encapsulation technology described by Ciba in U.S. Pat. Nos. 5,492,646; 5,460,817 and 5,324,445 and in PCT publication WO 97/24178, the disclosures of which are incorporated herein by reference.

Encapsulation was accomplished using a suitable co-polymer of styrene (when preparing sample lots #57 and #63) or methyl methacrylate (when preparing sample #37) and t-butyl amino ethyl methacrylate was synthesized by isothermal solution polymerization in an organic solvent using an azo initiator. Aqueous acetic acid solution was then added to the organic solution and the organic solvent was distilled off, leaving a 20–30% weight solution of the co-polymer, as the acetate salt, in water at pH 4–5.5. The solution was mixed with a liquid amylase preparation and dispersed in hydrocarbon oil, with adjustment of the pH to 4.5, followed by distillation to produce a dried dispersion. The dispersion was then held at 100° C. for 60 minutes under vacuum to drive off acetic acid. A surfactant wetting agent was added to the liquid formulation to allow wetting in aqueous solutions. Preferably aggregation of the enzyme capsules is avoided when they are mixed with the other components of the drilling fluid formulations. In this regard, it is important that the pH of the fluid be above the yield pH before the addition of the capsules.

The encapsulated enzyme was tested in five reservoir drilling fluid formulations and was found to have little or no effect on fluid properties at pH 10 and above, although some lots of encapsulated enzyme produced small changes due to trace amounts of unencapsulated enzyme. Operating at pH 11.6 can control the unencapsulated enzyme. The fluids are stable to hot-rolling and shear at 60° C. (158° F.). Reducing the pH of the fluid to 5 produces or "triggers" the destruction of the starch components of the fluid by first causing a change in the polymer that results in the release of the enzyme. Without wishing to be bound by a particular theory of the mechanism of action, the encapsulating material is believed to become more permeable to the enzyme or to be disrupted. As a result of the action of the enzyme on the starch substrate- the fluid settles and allows easy recovery of the brine. Filter cakes made with these fluids are impermeable when pressured with nitrogen gas and neutral to basic brines. Mild acids, such as that produced by $CO_2$ gas, make the filter cakes highly permeable. As $CO_2$ permeates the neutral pH NaCl brine, it forms carbonic acid, $H_2CO_3$, which ionizes and lowers the pH to 5 or less. As the filter cakes see this lower pH, the encapsulated enzymes are released to degrade the starches and open pathways for brine to permeate through the cake whereby the integrity of the cake is destroyed.

It is preferable that the enzyme chosen demonstrate the greatest retention of activity after exposure to well bore temperatures over time. Based on the data in Table III, Amylase A, obtained from Novo-Nordisk A/S, Denmark was selected for use with the current example.

TABLE III

Stability of starch enzymes at temperature, expressed as % residual activity

| Product/Temperature | 1 week | 2 weeks | 3 weeks |
|---|---|---|---|
| Amylase A/70° C. (158° F.) | 70 | 63 | 67 |
| Amylase A/90° C. (194° F.) | 38 | 18 | 16 |
| Amylase B/70° C. (158° F.) | 60 | 47 | 43 |
| Amylase B/90° C. (194° F.) | 20 | 9 | 9 |

The method involves suspending 42 grams of starch in 1 L of water, mixing for 15 minutes. Baseline viscosity was established by monitoring viscosity at five-minute intervals for 60 minutes. Enzyme treatments were mixed into the starch, observing the course of degradation as reduction in viscosity. The procedure used an API style, three-blade propeller on a Hamilton Beach mixer controlled by a rheostat. Mixing time was increased to 60 minutes mixing time.

FIG. 1 provides a graphical representation of representative data comparing the Starch (Flo-Trol) Suspension Viscosity with mixing time. These data demonstrates that the viscosity of the Flo-Trol test suspension stabilized for at least one hour after 40 min. mixing time.

Figure 2:
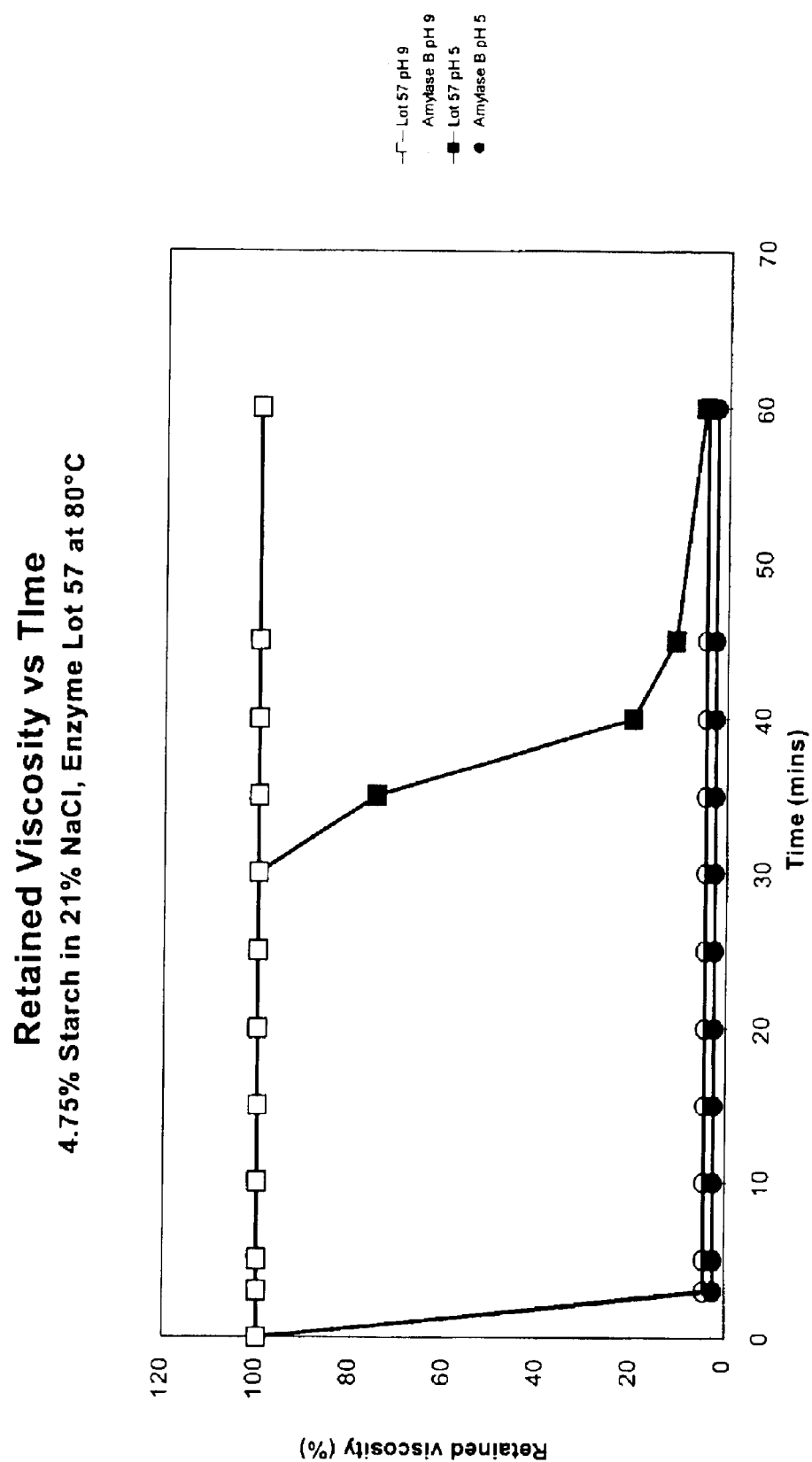
FIG. 2 is a graph illustrating the deviscosifying action of an unencapsulated enzyme.

Using the procedures outlined above, a 47.5 g/L Flo-Trol suspension in 21 wt % NaCl brine was prepared. Four aliquots were taken. The pH of two was adjusted to 5 with dilute hydrochloric acid. The pH of the remaining two aliquots were adjusted to 9 with dilute caustic. Samples were heated to 80° C. (176° F.). One set of pH 9 and 5 aliquots was treated with 30.4 mg/L of starch enzyme in solution. An equivalent 30.4 mg/L of enzyme was added as micron-sized polymer capsules suspended in hydrocarbon. FIG. 2 is a graph showing the action of raw enzyme and encapsulated enzyme lot, referred to as Sample #57, on starch at pH 5 and 9, at 80° C. (176° F.). Viscosity measured at 600 rpm on Fann 35, normalized to value after pH adjustment and before enzyme treatment. As shown in FIG. 2, the deviscosifying action of unencapsulated enzyme is immediate, reducing measured viscosity 90% in minutes at both pH 9 and pH 5. The pH 9 suspension treated with encapsulated enzyme sample #57 showed no degradation in 60 minutes. However, the pH 5 suspension treated with encapsulated enzyme sample #57 showed reduced viscosity starting at 30 minutes, with 90+% reduction obtained in 60 minutes.

The deviscosification by raw enzyme at pH 9 demonstrates control by the encapsulated enzyme. The similar, although delayed, deviscosification of the pH 5 encapsulated enzyme/starch systems demonstrates the release of enzyme in response to a different pH.

Figure 3:
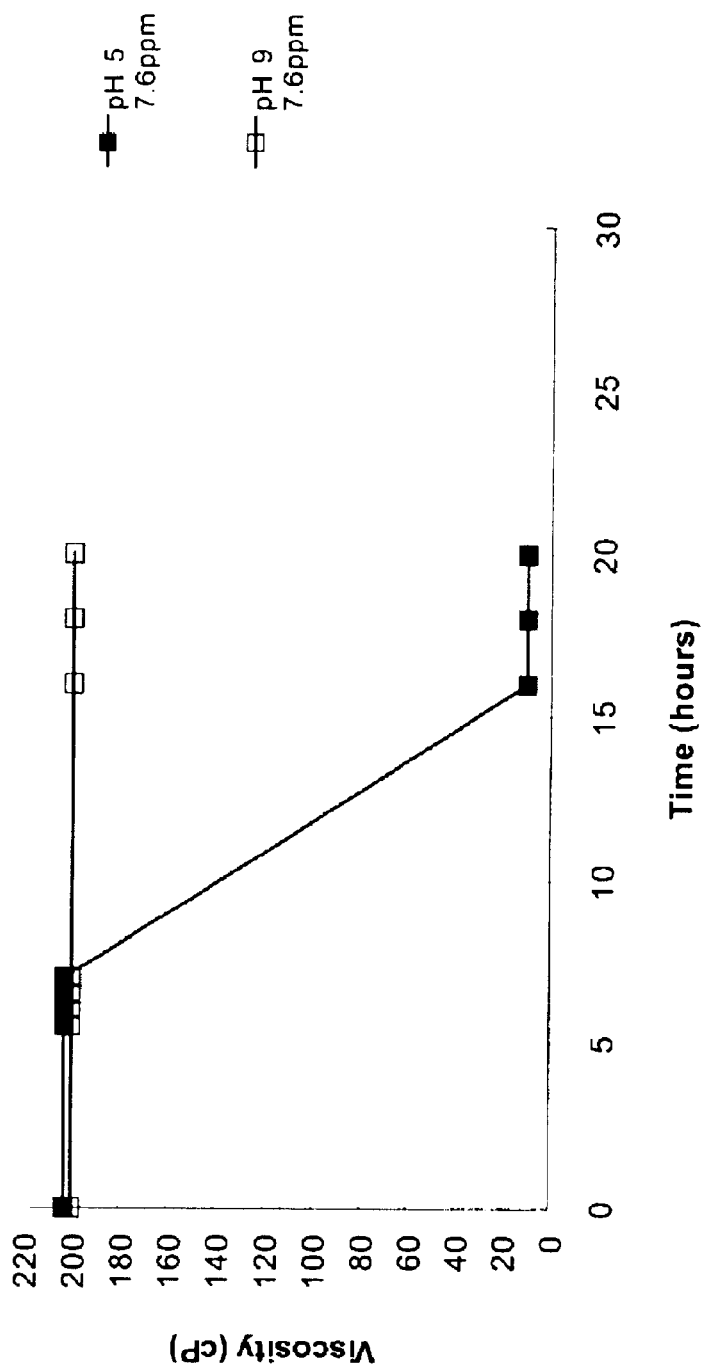
FIG. 3 is a graph showing enzyme release and control by pH of one embodiment of an encapsulated enzyme/starch composition.

One of skill in the art should appreciate that drilling requires stability over the span of several days to two weeks, so longer-term exposures were tested. Stability at pH 9 for 20 hours is shown in FIG. 3. FIG. 3 is a graph showing enzyme release and control by pH at 60° C. (158° F.). Aliquots of 47.5 g/L slurry of starch adjusted to pH 10 or 5 and treated with encapsulated enzyme. Viscosity was estimated from visual observation. Portions of a standard starch slurry were separately adjusted to pH 9 and 5, heated to 60° C. (158° F.), and inoculated with 7.6 ppm of encapsulated enzyme. The pH 9 sample retained viscosity for 20 hours. The pH 5 material lost viscosity somewhere between the observations at 7 and 16 hours. An important finding was that pH of these systems drifts from the initial value, and must be either buffered or maintained by adjustment with acid or base.

Figure 4:
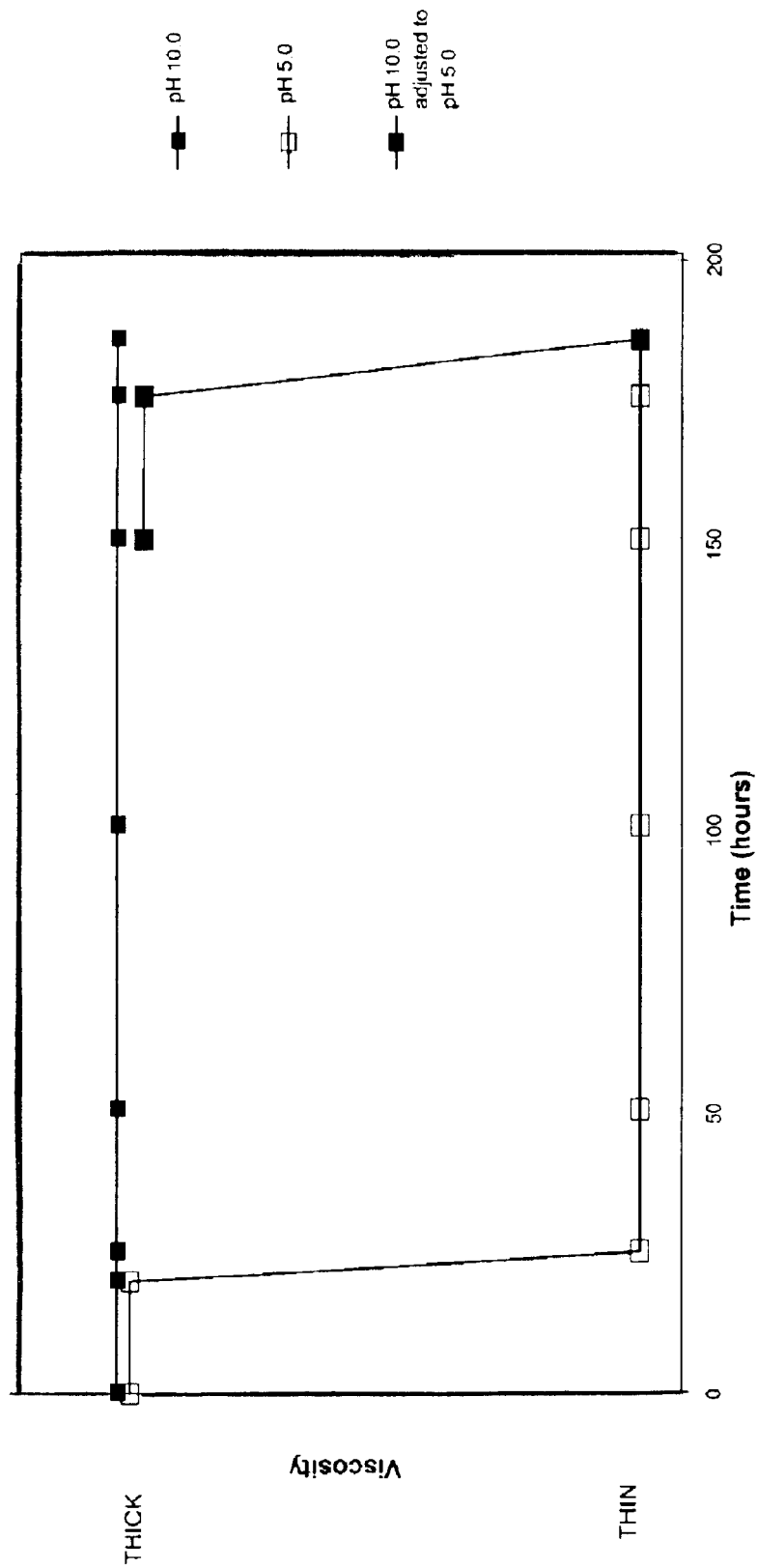
FIG. 4 is a graph showing stability of an encapsulated enzyme/starch system at pH 10 and release upon adjustment to pH 5.

While weeklong stability is essential, release upon pH change after the week is equally important. Representative data resulting from extending test periods to 185 hours is shown in FIG. 4. FIG. 4 is a graph demonstrating weeklong stability of encapsulated enzymes at pH 9 with release upon adjustment to pH 5. The points on the graph are visual assessments. One aliquot of a 47.5-g/L slurry of Dual-Flo starch in 21 wt % NaCl brine was adjusted to pH 10. Another aliquot was adjusted to pH 5. Each was treated with 7.6 mg/L of encapsulated enzyme, and held at 60° C. (158° F.). Viscosity was monitored by visual observation of the sample when lightly shaken. As shown in the graph, the pH 10 aliquot retained viscosity for 185 hours. The pH 5 sample lost viscosity between observation at 20 and 25 hours. FIG. 4 shows that the pH 10 sample was split at 150 hours and one portion was adjusted to pH 5 with acid. Between observation at 175 and 185 hours, the pH 5 portion lost viscosity, demonstrating release of the enzyme.

Figure 5:
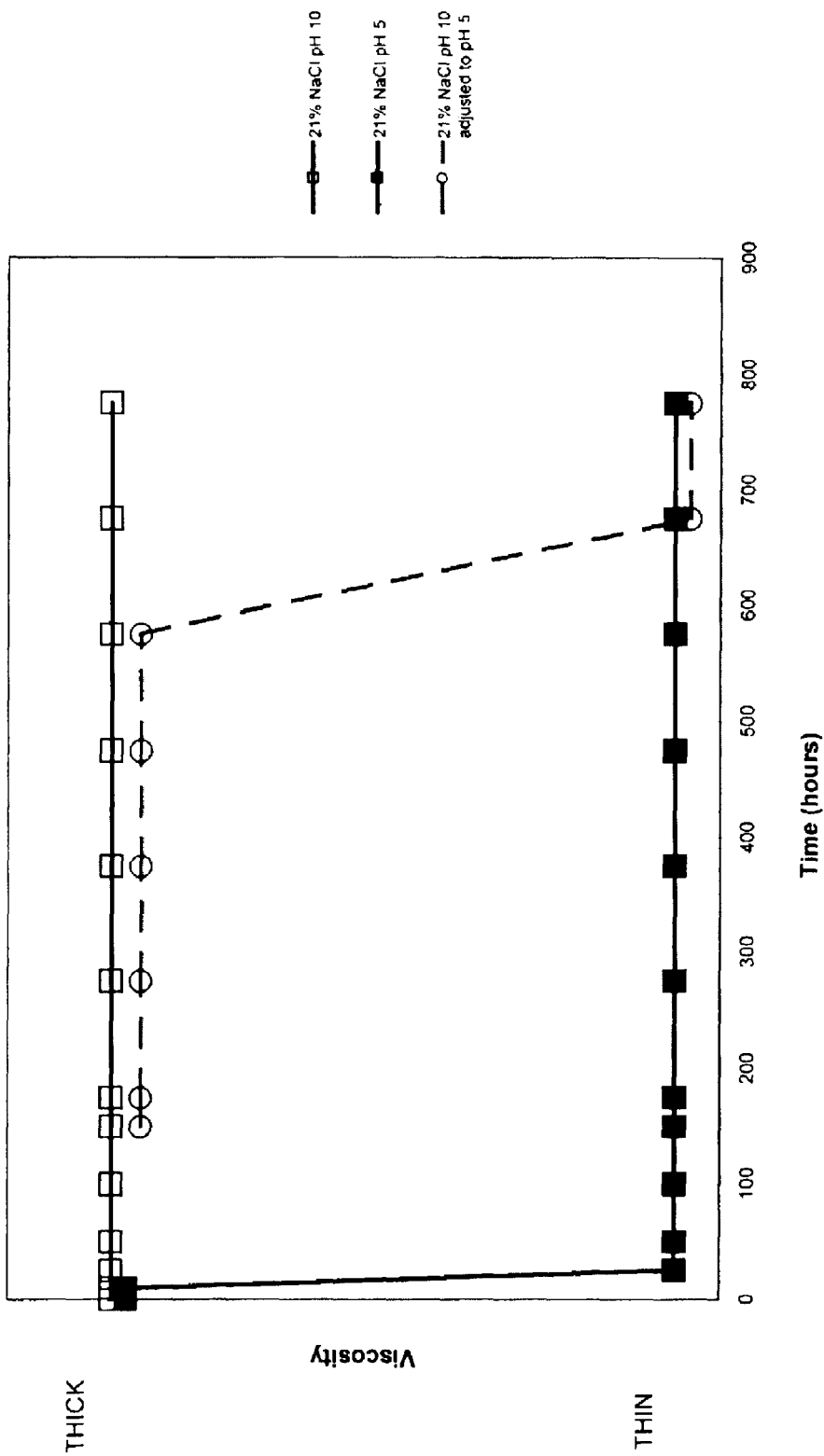
FIG. 5 is a graph illustrating month-long stability of enzyme capsules at pH 10 and release upon lowering the pH to 5.

On occasion, drilling operations are interrupted by hurricanes, lack of supplies, armed insurrection, etc. It would be desirable for the encapsulated enzyme to be stable considerably longer than the expected drilling time. The results of a month-long exposure experiment are shown in FIG. 5. FIG. 5 is a graph demonstrating month-long stability of enzyme capsules at pH 10 with release upon pH lowered to 5. 47.5 g/L Dual-Flo starch slurry adjusted to pH 10 and 5, treated with 7.6 mg/L encapsulated enzyme. After 150 hours, a portion of the pH 10 sample was adjusted to pH 5, which deviscosified between observations at 600 and 680 hr. Slurry samples were pH adjusted, treated with encapsulated enzyme and dynamically aged by hot rolling at 60° C. (158° F.). A pH 10 suspension retained viscosity for 780 hours. A sample adjusted to pH 5 before application of the encapsulated enzyme lost viscosity overnight.

Release of the enzyme was observed in a portion of the pH 10 sample that was adjusted to pH 5 at 150 hours. While delayed, the sample deviscosified between observations at 600 and 680 hours.

Figure 6:
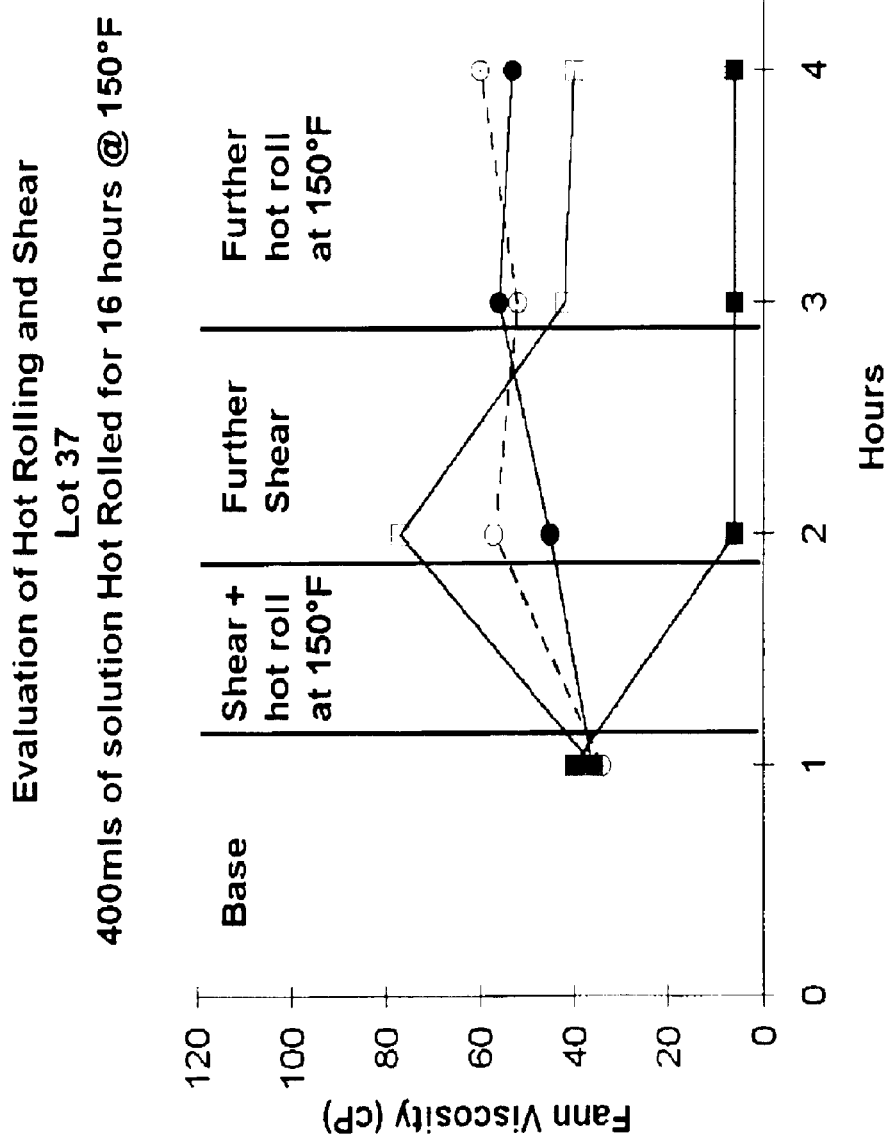
FIG. 6 is a graph illustrating the effect of shear on starch slurry viscosity in the presence of one embodiment of an encapsulated enzyme composition, at pH 5 and 10.

An important feature of any drilling fluid additive is its ability to resist the effects of shear forces generated in transiting the bit jet and impacting on the rock surface being drilled. This was simulated by using a Silverson LR4T mixer with a general dispersing head to shear a Dual-Flo starch slurry for 10 min at 6000 rpm. FIG. 6 is a graph showing the effect of shear on starch slurry viscosity in the presence of encapsulated enzymes at pH 5 and 10. The viscosity of starch slurries at each step of challenging the samples with the Silverson mixer is shown. Step 1 adjusted the slurries to pH 10 and pH 5. Second, shear was applied and hot rolled for 16 hours at 60° C. (158° F.). Third came another shear treatment and hot rolling. Step 4 monitored viscosity for an additional day. Untreated starch at pH 10 and 5 showed very little change in viscosity. The pH 5 encapsulated enzyme sample lost viscosity at step 2. The pH 10 sample shows a bit higher viscosity at step 2, but the later readings fall into the range seen for the starch-only samples. This small effect may be due to a trace amount of unencapsulated enzyme present in this lot of encapsulated enzyme.

Figure 7:
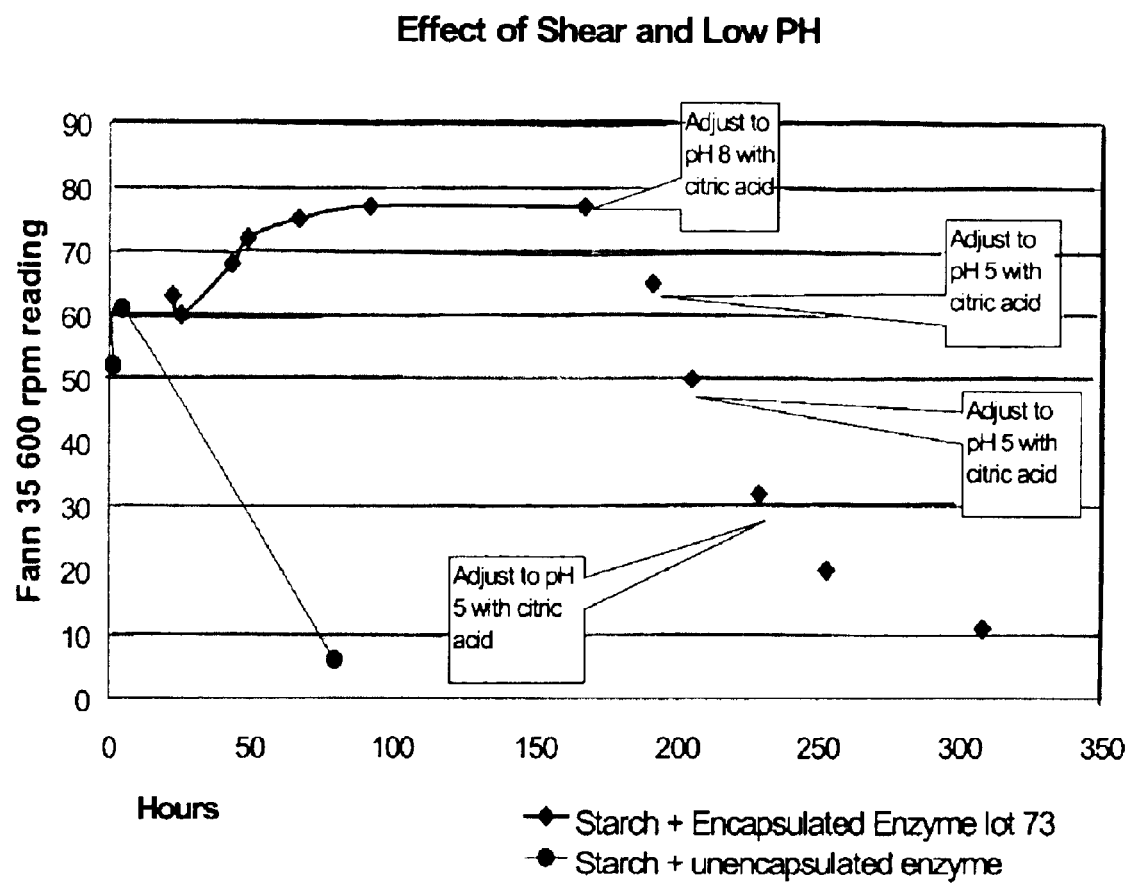
FIG. 7 is a graph showing the effect of shear on encapsulated enzyme release in starch slurry at pH 10 and after lowering to pH 5, for one embodiment of an encapsulated enzyme/starch system.

A further test of shear is shown in FIG. 7 illustrating the effect of shear on encapsulated enzyme release in starch slurry at pH 10 lowered to pH 5, Here aliquots of starch were adjusted to pH 10 with 0.5 g/L MgO and heated to 60° C. (158° F.). One was treated with enzyme, the other with encapsulated enzyme. Both samples were sheared for 10 minutes at 6000 rpm, and hot rolled. The enzyme-treated sample lost viscosity between observations at four and Fifty hours. The encapsulated enzyme gained some viscosity over fifty hours, possibly due to trace free enzyme. At 67 hours, the viscosity stabilized, remaining at that value when rechecked at 167 hours, demonstrating the encapsulated enzyme was controlled.

The pH of this sample was then lowered to 8 with citric acid. Some loss of viscosity was found when rechecked 18 hours later. Because MgO buffers pH as a solid, acid additions can produce short term reductions in pH that are slowly counteracted by dissolution of MgO. When checked, the pH of the sample had risen well above 8. More acid was used readjust pH to 5.5, and sample hot rolled 16 hours. The pH was further lowered to 5. At this point viscosity was reduced by more than 80%.

EXAMPLE 2

Four exemplary reservoir drilling fluids containing the encapsulated α-Amylase enzyme, encapsulated as described above, were prepared and it was demonstrated that the incorporation into finished reservoir drilling fluid without release of enzymes under operating conditions is feasible. The composition of the four reservoir drilling fluid formulations numbered 1 to 4 are reported in Table IV. Fluids were prepared using standard oilfield products and procedures. References to numbered fluids in the following tables refer to this chart.

Fluid 1 shows good rheology and fluid loss control as shown in Table V. When treated with encapsulated enzyme and maintained at pH 10, rheology and fluid loss properties are essentially unchanged. Treatment with neat enzyme results in loss of viscosity and an increase in API fluid loss. When the stable pH 10 fluid was adjusted to pH 5 with phosphoric acid, rheology and fluid loss go to nearly the levels of the fluid treated with neat enzyme.

TABLE IV

Reservoir Drilling Fluid Formulations

| Material | Unit | 1 | 2 | 3 | 4 | Product Function |
|---|---|---|---|---|---|---|
| Water | g | 256.8 | 311.2 | 317.7 | 317.7 | Liquid phase |
| KCl | g | | | | 17.1 | Density |
| NaCl | g | 68.3 | 34.2 | 17.1 | — | Density |
| PROCARB | g | 50 | 50 | 50 | 50 | Bridging solid/density |
| DUAL-FLO | g | 5 | 5 | 5 | 5 | Starch fluid loss additive |
| BIOVIS | g | 1.5 | 1.5 | 1.5 | 1.5 | Scleroglucan based viscosifier |
| SAFECIDE | g | 0.2 | 0.2 | 0.2 | 0.2 | Biocide |
| SAFE DFOAM | g | 0.2 | 0.2 | 0.2 | 0.2 | Foam suppressant |
| MgO | g | 1.5 | 1.5 | 1.5 | 1.5 | Alkaline pH buffer |

TABLE V

Properties of Fluid 1 treated with enzyme and encapsulated enzyme

| Hours of Dynamic Aging (60° C.) | Fann 35 Dial readings at: | | | | | | | pH | API Fluid Loss (mL) |
|---|---|---|---|---|---|---|---|---|---|
| | 600 rpm | 300 rpm | 200 rpm | 100 rpm | 6 rpm | 3 rpm | 10 sec Gel | | |
| Formulated fluid 1 | | | | | | | | | |
| 18 | 68 | 48 | 40 | 31 | 15 | 13 | 17 | 9.6 | 6.3 |
| 288 | 58 | 43 | 40 | 31 | 14 | 12 | 17 | 9.4 | 5.5 |
| Formulated fluid 1 + 0.7 ml encapsulated enzyme #63 (10%) suspension | | | | | | | | | |
| 18 | 67 | 47 | 41 | 33 | 16 | 14 | 18 | 9.7 | 4.4 |
| 42 | 70 | 50 | 43 | 33 | 15 | 13 | 17 | 9.5 | 4.6 |
| 120 | 85 | 59 | 49 | 37 | 16 | 13 | 16 | 9.5 | 5.6 |
| Formulated fluid 1 + 7.6 ppm neat enzyme | | | | | | | | | |
| 18 | 37 | 26 | 22 | 18 | 10 | 9 | 12 | 9.4 | 23 |
| 288 | 32 | 25 | 22 | 18 | 9 | 8 | 10 | 8.6 | 23 |
| Formulated fluid 1 + 3 ml #63 after 18 hours aging pH reduced to 5 with $H_3PO_4$ | | | | | | | | | |
| 18, treat, 18 | 44 | 31 | 29 | 24 | 11 | 9 | 13 | 6.4 | 18.2 |
| 18, treat, 114 | 41 | 31 | 26 | 21 | 11 | 10 | 14 | 7.7 | 21.5 |

Fluids 2, 3 and 4 show that a range of brine salinities can be used to make stable fluids at pH 10 incorporating encapsulated enzyme. Table VI shows the rheologies and fluid losses of the treated and untreated fluids are essentially unchanged.

TABLE VI

Fluids 2, 3 and 4 Before and After Treatment with Encapsulated Enzyme

| Time (hrs.) | 600 rpm | 300 rpm | 200 rpm | 100 rpm | 6 rpm | 3 rpm | 10" Gel | pH | API (ml) |
|---|---|---|---|---|---|---|---|---|---|
| Formulated fluid 2 dynamic aged at 60° C. | | | | | | | | | |
| 68 | 41 | 31 | 27 | 21 | 12 | 10 | 13 | 9.8 | 6 |
| Formulated fluid 2 + 2 ml #37 (50% suspension) dynamic aged at 60° C. | | | | | | | | | |
| 68 | 40 | 28 | 24 | 19 | 10 | 8 | 11 | 9.7 | 5.6 |
| Formulated fluid 3 aged at 60° C. | | | | | | | | | |
| 68 | 37 | 28 | 25 | 20 | 11 | 10 | 13 | 9.9 | 5.7 |
| Formulated fluid 3 + 2 ml #37 (50% suspension) dynamic aged at 60° C. | | | | | | | | | |
| 68 | 38 | 28 | 24 | 20 | 11 | 9 | 12 | 9.7 | 5 |
| Formulated fluid 4 dynamic aged at 60° C. | | | | | | | | | |
| 68 | 39 | 29 | 25 | 21 | 11 | 10 | 14 | 10.2 | 5.5 |
| Formulated fluid 4 + 2 ml #37 (50% suspension) dynamic aged at 60° C. | | | | | | | | | |
| 68 | 34 | 25 | 21 | 18 | 9 | 8 | 11 | 9.9 | 5.9 |

Because lowering filter cake permeability was a desired objective in this project, High Pressure High Temperature (HTHP) filter cakes were made using fluids 2, 3, and 4 by placing the fluids into a standard HTHP cell with an aloxite disc for the filtration medium. The fluid is loaded into the cell and pressured to 500 psi with nitrogen gas, a typical over pressure between the hydrostatic pressure of typical drilling fluid and the pressure of the formation. The cell is heated to test temperature, and a valve behind the disc opened to allow filtrate to be collected in a receiver flask. The burst of liquid caught in the first minute was recorded as spurt loss. At 180 minutes the cumulative filtrate volume was recorded and the valve closed. The cell was depressurized and the loose mud was poured out of the cell, leaving the filter cake adhered to the aloxite disc. Brine was poured into the cell. The cell was pressured to 65 psi with carbon dioxide, simulating typical completion fluid overpressure. As shown in Table VII, filter cakes from fluids containing encapsulated enzyme passed slightly greater amounts of the NaCl brine than filter cakes from untreated fluids, but both were within acceptable limits.

As $CO_2$ permeates the neutral pH NaCl brine, it forms carbonic acid, $H_2CO_3$, which ionizes and lowers the pH to 5 or less. As the filter cakes see this lower pH, the encapsulated enzymes are released to degrade the starches and open pathways for brine to permeate through the cake.

TABLE VII

HTHP Fluid Loss of Filter cake with $CO_2$

| Fluid Loss (mL) with 500 psi $N_2$ at 60° C. | NaCl Brine loss (mL) through filter cake after being shut in overnight under 65 psi $CO_2$ at 60° C. | | | | | | |
|---|---|---|---|---|---|---|---|
| Spurt | 180 m | 90 m | 3.25 h | 5 h | 8 h | 25 h | 29 h |
| Formulated fluid 2 aged at 60° C. | | | | | | | |
| 2.5 | 19 | 2.8 | 3.8 | 4.5 | 6 | 11 | 13 |
| Formulated fluid 2 aged at 60° C. + 2 ml #37 (50% suspension) | | | | | | | |
| 3 | 15 | 2.3 | 4.3 | 5.5 | 8.3 | 21.5 | 24 |
| Formulated fluid 2 aged at 60° C. | | | | | | | |
| 2 | 15 | 2 | 3 | 4 | 5.5 | 11 | 12.5 |
| Formulated fluid 2 aged at 60° C. + 2 ml #37 (50% suspension) | | | | | | | |
| 2 | 16.8 | 1.8 | 37 | 39 | — | — | — |
| Formulated fluid 3 aged at 60° C. | | | | | | | |
| 1 | 17.5 | 1 | 26.5 | 27.5 | — | — | — |
| Formulated fluid 3 aged at 60° C. + 2 ml #37 (50% suspension) | | | | | | | |
| 2 | 21 | 3 | 38 | 41.5 | — | — | — |

10 micron ceramic disc used for all tests

Test interrupted after HTHP fluid loss. Tests restarted after 2 weeks, HTHP cells rolled for 1 hour at 60° C. before being emptied refilled with brine and $CO_2$ pressure applied The fluid in use must withstand the shear forces of drilling, creating low permeability filter cakes that are stable to clear brine displacements. When the chemical trigger is received, filter cake permeability must then be increased to allow production of the fluids held within the rock. To demonstrate these features, a fluid was prepared using the formulation shown in Table VII.

The fluid was prepared and hot rolled at 150° F. for 16 hours. The fluid was split into two, 350 mL "lab barrels" (bbl). One lab bbl was labeled CZ, and treated with 0.5 mL of a 1:1 mixture of an encapsulated enzyme suspension and a normal-paraffin oil (Norpar 13). The other lab bbl was labeled Control, and was treated with 0.5 ml of the paraffin oil containing no encapsulated enzyme.

TABLE VIII

Shear/cake test fluid

| Ingredient | Loading per 350 mL |
| --- | --- |
| Tap Water | 299 mL |
| NaCl | 95 g |
| KCl | 10.5 g |
| Biopolymer viscosifier (FLOVIS PLUS) | 0.75 g |
| MgO | 3 g |
| Calcium carbonate (SAFE CARB F) | 15 g |
| Starch (DUAL-TROL) | 5 g |
| THPS biocide | 0.02 mL |
| 0.1 N NaOH solution | adjust to pH 10.5 |
| Final Density | 10.2 lb/gal |

Each fluid was sheared three times for 5 minutes each time using a Silverson L4RT at 8000 rpm. Both fluids were hot rolled at 54° C. (130° F.) for 16 hours. After the hot roll, each fluid was again sheared three times for 5 minutes each time. Fann 35 rheology and pH were taken on the fluids throughout the shear/hot roll regimen, and remained consistent. See Table IX.

TABLE IX

Effect of Shear OD Control and CZ fluids

| Rpm | 16 hr hot rolled 150° F. | After 3 × 5 minute shear | | Plus 16 hr hot roll at 130° F. and 3 × 5 min shear | |
| --- | --- | --- | --- | --- | --- |
| | | Control | CZ | Control | CZ |
| 600 | 33 | 29 | 28 | 31 | 31 |
| 300 | 22 | 20 | 20 | 21 | 21 |
| 200 | 18 | 17 | 16 | 17 | 18 |
| 100 | 14 | 12 | 12 | 13 | 13 |
| 6 | 5 | 4 | 5 | 4 | 4 |
| 3 | 4 | 3 | 3 | 3 | 3 |
| pH | 10.2 | 10.6 | 10.7 | 10.6 | 10.5 |

Figure 8:
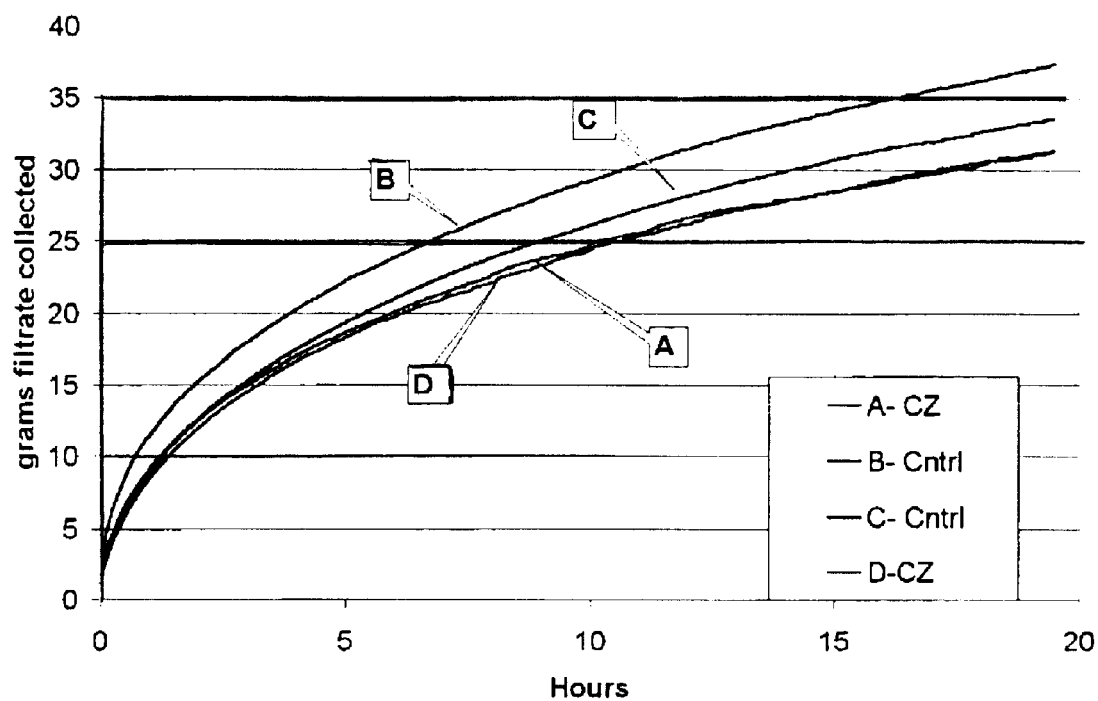
FIG. 8 is a graph illustrating an example of fluid loss control for control and encapsulated enzyme containing fluids under 100 psi $N_2$ pressure.

Each fluid was split into two parts and loaded into HPHT cells. Filter cakes were built for 19 hours at 130° F. under 1000-psi nitrogen on FAO-5 ceramic disks. FIG. 8 is a graph illustrating fluid loss for Control and CZ fluids under 100 psi $N_2$. Fluid loss of the base fluids was slightly higher than the CZ samples, but all were within acceptable range.

After 19 hours, the cells were depressurized and the drilling fluid poured off. One filter cake of each mud was treated with a 3% KCl brine previously adjusted to pH 9 with caustic, and the cells pressured to 100 psi with nitrogen from a common gas manifold. The other filter cake was covered with 3% KCl brine with no pH adjustment, and both cells pressured to 100 psi with $CO_2$ from a common gas manifold.

Figure 9:
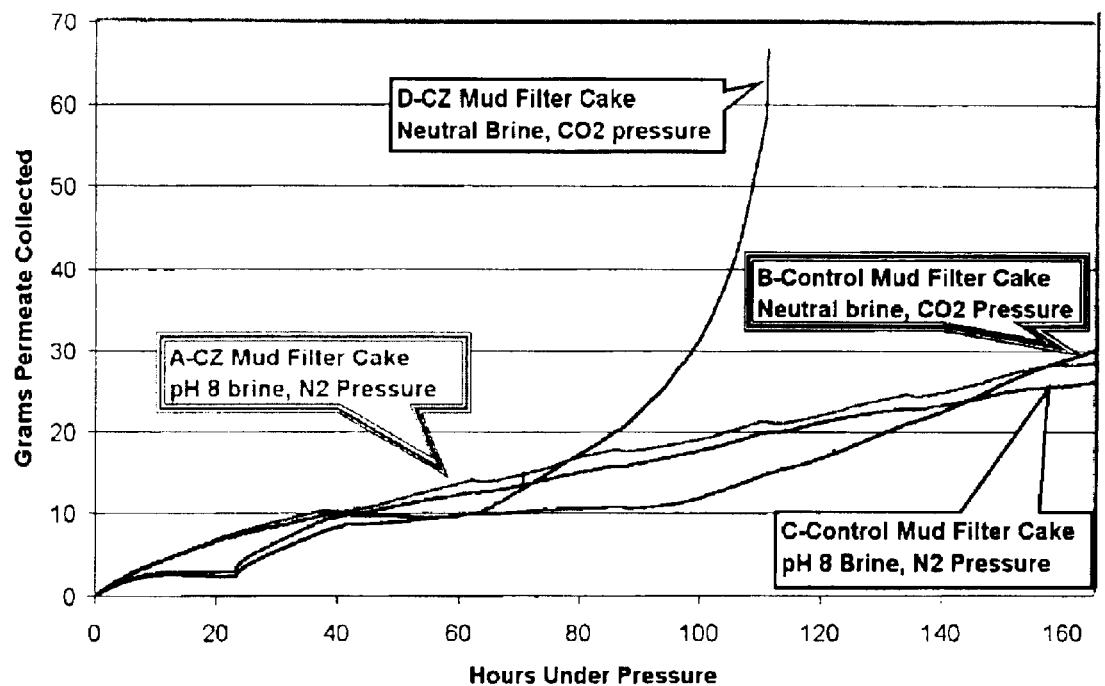
FIG. 9 is a graph showing that in one embodiment a mud filter cake containing an encapsulated enzyme broke with $CO_2$ pressure but not with $N_2$.

FIG. 9 is a graph illustrating brine passage through filter cakes under 100 psi gas pressures. As shown, both the filter cake from the Control fluid and the filter cake from the CZ fluid containing encapsulated enzyme had low levels of permeability to pH 9 KCl brine under 100 psi of nitrogen for 160 hours.

Both $CO_2$ traces show an unusual slow down in collection rate in the first 24 hours, followed by a sudden increase in rate. This feature was produced by a partially closed valve in the $CO_2$ manifold that shut off pressure to cells after the initial adjustment, allowing the pressure to drop to low levels, reducing permeation of the fluid through the filter cake. Re-setting the valve after 24 hours brought the pressure back, and fluid flow resumed at that point.

The Control mud filter cake exposed to neutral pH KCl brine and 100 psi of $CO_2$ allowed fluid to pass at about the same rate as the two nitrogen-pressured cakes. The filter cake built from the enzyme-containing CZ fluid began leaking fluid at a fast rate after about 60 hours of exposure, culminating in catastrophic loss of the entire brine fill at about 105 hours. Only the experiment comprising the three items of the invention, i.e. a degradable substrate, an inactivated enzyme agent and triggering low pH produced significant change in permeability.

For the purposes of this disclosure, the word "enzyme" is meant to include enzymes obtained from living organisms, created from the genetic material of living organisms, organisms containing enzymes or organisms containing the genetic material which creates enzymes, spores, seeds and other catalytic materials.

Additional Embodiments

A variety of alternative embodiments that utilize a triggered release material and specific pH triggering of an encapsulated substance are also encompassed by the present invention. Some of these include;

$CO_2$ or pH change-released breakers of all sorts, including enzymes, oxidizers, acids (derived from, e.g., a neutral polymer like polyhdroxyacetic acid), for breaking fracturing fluids, workover, gravel pack and completion fluids.

Perf-tunnel fluid loss control pills formulated with an enzymatically degradable material, and may in addition have any of several viscosifiers and/or solid bridging agents and the appropriate encapsulated enzymes. Perf pills are placed into a well bore to control loss of fluid through perforation tunnels shot in to the rock. As the tunnels may be many inches deep, breaker chemicals applied at the well bore have difficulty reaching the far end of the fluid and filter cake packed into the tunnel. Permeation of $CO_2$ into the tunnel from the formation can trigger breakdown of the material across the entire length of the tunnel.

Molded starch-polymer components containing encapsulated enzyme for use in down-hole and surface oil field applications could provide means of their decomposition in response to changes in well bore conditions or application of a chemical signal. For example, a starch-polymer containing encapsulated enzyme could be molded into a perforation ("perf") gun holder for use in constricted well bores where recovery after perforation may be impossible. Unretrieved guns physically interfere with many production operations, and a polymer that degrades upon prolonged exposure to $CO_2$ may remove such impediment.

Molded starch-polymer components containing encapsulated enzyme molded into a film might be used to sheathe "pre-packed" sand screen assemblies. The units could be placed into the well bore without plugging the epoxied sand bed with particles from the well bore, and the film degraded by $CO_2$ exposure when the well is brought on line to expose the screen.

Molded starch-polymer components containing encapsulated enzyme molded into a stop or stay restraining a valve controlling flow along the wellbore to the surface. As the formation is drained of oil, water enters the well bore, reducing the net flow of oil from the well, and causing disposal problems on the surface. The water passing over the stay or stop could trigger release of the encapsulated enzyme, releasing enzymes to degrade the polymer and allowing the valve to close, sealing off the water producing zone from the still productive portions of the well.

Molded starch-polymer components containing encapsulated enzyme molded into surface fixtures such as base pads, oil storage tanks, oil-carrying pipes, could be washed free of oil with a vinegar wash and left to decompose at an enhanced rate at the well site or in land farm disposal. Examples of such molded, degradable polymers are given in BIODEGRADABLE POLYMERS IN NORTH AMERICA & EUROPE, available from MarTek, NY, N.Y.

Molded starch-polymer components containing encapsulated enzyme molded into flakes or granules for use as a bridging agent in high pH drilling fluids or fluid loss control pills. These particles would be stable at high pH, but destroyed by weak acid at low temperature or self-destructing by $CO_2$ exposure, opening up producing rock in zones not reached by an applied external breaker.

Starch-viscosified fracturing fluids containing the encapsulated enzyme for use in fracturing wells, such that fluid that is not produced back, loses viscosity with prolonged exposure to $CO_2$.

Starch-based adhesives containing encapsulated enzymes for binding plywood, pressboard and other well site building materials. At end of well operations, a mild acid, such as a vinegar wash, could be used to activate for improved degradation of said materials.

Starch-based adhesives containing encapsulated enzymes for reversibly sealing downhole fractures.

Cellulose fiber materials containing encapsulated hemicelluases for the above uses.

Encapsulated enzymes, organisms or spores that are released when the mud is discharged into the environment, facilitating biodegradation of the fluid.

Encapsulated protease and esterase enzymes that are contained within the fluid or filter cakes, becoming activated with $CO_2$ exposure. These enzymes are free to react with esters either contained within the fluid or added to the fluid, generating free acid by breaking the ester bonds. Encapsulated iron, zinc or other metal compounds or complexes such as EDTA chelates, released upon exposure to $H_2S$ and the resulting drop in pH, to control $H_2S$ incursion. Encapsulation keeps the metal species from interfering with the performance of fluid materials such as xanthan gums or starches, and yet makes the material available to react with and render harmless the toxic $H_2S$.

Encapsulated oxidants that are kept from reacting with the circulating fluid but are released upon application of mild acid or reservoir $CO_2$. An existing product, magnesium peroxide, is used in this way, added as a solid to the system kept at a high pH. The magnesium peroxide is kept from dissolving and attacking the fluid by a surface reaction of $Mg(OH)_2 \leftarrow \rightarrow Mg^{2+} + 2\ OH^-$. However, because it is in direct contact with the fluid, eventually the particles releases all the Mg peroxide by the dynamic equilibrium of the surface reaction. Anti-oxidants or sacrificial organic materials must be added to consume the prematurely released peroxide. This limits the application to lower temperatures and short times. A capsule that prevents or slows the rates of the dissolution reaction would preserve the oxidizer, delivering more to breaking the cakes, and reducing or eliminating the need for anti-oxidants.

Encapsulated peroxidase enzymes or other catalysts or antioxidants for destruction of peroxide created by or in excess from application of oxidative breakers. Kept from interfering with the action of the oxidizers at high pH but released upon prolonged exposure to $CO_2$ or other lowering of pH to consume the peroxides and reduce corrosivity and potential formation damage by iron oxidation.

Encapsulated polyhydroxyacetic acid. This has been used several times as a fluid component that is neutral and unreactive under initial conditions, but over time and temperature hydrolyzes to release hydroxyacetic acid. This rate of release is uncontrolled because the released acid catalyses the further breakdown of the polymer, resulting in a cascade of release. A capsule able to retard yield until a critical pH was reached could provide a much greater level of control.

Drilling fluid for locations known to have problems with stuck pipe, comprising an encapsulated enzyme or other breaker, and a corresponding substrate as a filter cake component. Differentially stuck pipe occurs when a modest loss of fluid thorough the sidewall of the bore pulls the drilling pipe against the side. The differential pressure between the wellbore and the rack sticks the pipe firmly in place. A common remedy is to replace the drilling fluid in the stuck region with materials such a organic solvents, surfactants, etc. that cause the established filter cakes to crack or break, dramatically increasing fluid loss. The invading front causes the pressure drop to move from the well bore to the radially expanding zone of fluid invasion. However, these specialty chemicals need to be immediately available in order to work. Success of freeing the pipe diminishes rapidly within the first three hours. Using an encapsulated material such as an enzyme as part of the drilling fluid would allow even a dilute acid wash to activate and break the cake, loosing the pipe.

In one preferred illustrative embodiment, the fluid includes more than one inactivated enzyme that are capable of being reactivated by the same or different triggering signals. Further, upon reactivation the reactivated enzymes are capable of acting upon the same or different substrates. Such substrate may be celluloses, derivatized celluloases, starches, derivatized starches, xanthans, and derivatized xanthans, therefore logically the preferred inactivated enzyme can be selected from the group consisting of endo-amylases, exo-amylases, isomylases, glucosidases, amyloglucosidases, malto-hydrolases, maltosidases, isomaltohydro-lases, malto-hexaosidases. In one illustrative embodiment, the reactivated enzyme is capable of being inactivated by application of a second triggering signal, so that the enzyme may go through one or more cycles of inactivation and reactivation. The second triggering signal may be the same or a different triggering signal. For example, in one illustrative embodiment, a change in pH conditions may be used to activate and inactivate an enzyme while in another illustrative embodiment a change in pH may activate the enzyme, but a change in temperature, or the concentration of the product of the enzymatic reaction may cause inactivation. Thus depending upon the method of encapsulation and the enzyme and substrate a wide range of potential triggering signals exist, but preferably the triggering signal is selected from exposure to a reducing agent, oxidizer, chelating agent, radical initiator, carbonic acid, ozone, chlorine, bromine, peroxide, electric current, ultrasound, or activator, or a change in pH, salinity, ion concentration, temperature, or pressure.

The present illustrative embodiment includes fluids used in the drilling of oil and gas wells and preferably the fluid is a circulating drilling fluid, completion fluid or workover fluid. Preferably the continuous fluid phase is water based.

As described above, the reactivated enzyme is capable of selectively acting upon a downhole substrate and thereby increasing the flow of production fluid. Preferably the substrate is a component of the filter cake that is formed during the drilling process. It is also preferred that the fluid be a fluid that is useful in the drilling of oil and gas wells and preferably the fluids are formulated and utilized as a circulating drilling fluid, completion fluid or workover fluid. The fluid of the present illustrative embodiment may include more than one inactivated enzyme that is capable of being reactivated by the same or different triggering signals. Upon reactivation the reactivated enzymes are capable of acting upon the same or different substrates.

The fluid of the present illustrative embodiment may include more than one inactivated enzyme, in which the inactivated enzymes are capable of being reactivated by the same or different triggering signals. Upon reactivation the reactivated enzymes are capable of acting upon the same or different substrates. As previously noted, in some embodiments the reactivated enzyme may be capable of being inactivated by application of a second triggering signal, and that second triggering signal may be the same or a different triggering signal. Thus, in some applications it may be advantageous for the inactivated enzyme to be able to go through one or more cycles of inactivation and reactivation.

The present invention also encompasses an illustrative composition including a continuous fluid phase and an inactivated enzyme, wherein upon application of a triggering signal the inactivated enzyme is reactivated to give a reactivated enzyme, and wherein the reactivated enzyme is capable of selectively acting upon a downhole substrate. Such an illustrative composition may include more than one inactivated enzyme, wherein the inactivated enzymes are capable of being reactivated by the same or different triggering signals, wherein upon reactivation the reactivated enzymes are capable of acting upon the same or different substrates. In one preferred embodiment of the illustrative composition the inactivated enzyme is inactivated by encapsulation.

The illustrative composition may be a circulating drilling fluid, completion fluid or workover fluid utilized in the oil and gas industry and it is preferred that the continuous fluid phase is water based.

The substrates for the enzyme may be selected from celluloses, derivatized celluloases, starches, derivatized starches, xanthans, and derivatized xanthans. Thus the inactive enzyme may be preferably selected from endo-amylases, exo-amylases, isomylases, glucosidases, amyloglucosidases, malto-hydrolases, maltosidases, isomaltohydro-lases, malto-hexaosidases. Regardless of the enzyme selected, the reactivated enzyme should be capable of being inactivated by application of a second triggering signal, that may be the same or a different triggering signal used to activate the enzyme. Therefore an enzyme may go through one or more cycles in inactivation and reactivation.

The triggering signal of the present illustrative embodiment may be exposure to a reducing agent, oxidizer, chelating agent, radical initiator, carbonic acid, ozone, chlorine, bromine, peroxide, electric current, ultrasound, or activator, or a change in pH, salinity, ion concentration, temperature, or pressure. The selection of the triggering signal will depend upon the conditions and formulations of the drilling fluid, the formation and the enzyme or enzymes involved.

While the compositions and methods of this invention have been described in terms of preferred embodiments, it will be apparent to those of skill in the art that variations may be applied to the process described herein without departing from the concept and scope of the invention. For example, although reservoir drilling fluids containing inactivated substrate-degrading agents, or enzymes, are emphasized in the foregoing examples and discussion, one can appreciate that with little or no modification similar compositions and methods may be readily employed with a variety of fluid or solid devices in surface as well as downhole operations. Similarly, the foregoing examples emphasize enzymes as preferred activatable substrate-degrading agents, however it should be understood that other chemicals or agents may be employed instead. For instance a microorganism, a co-factor, a spore, an inorganic chemical, and precursors thereof, could be substituted for an enzyme in some cases. All such similar substitutes and modifications apparent to those skilled in the art are deemed to be within the scope and concept of the invention as it is set out in the following claims. The disclosure of U.S. Provisional Patent Application No. 60/165,393 is incorporated herein by reference.

What is claimed is:

1. A method of degrading a predetermined substrate used for hydrocarbon exploitation comprising:

providing a fluid or a solid, or a mixture thereof, containing a substrate-degrading agent inactivated by encapsulation, said inactivated substrate-degrading agent initially being substantially inactive, and subsequently becoming active in response to a predetermined triggering signal; and applying the triggering signal to said fluid or solid or mixture thereof such that said substrate-degrading agent becomes activated, the activated substrate-degrading agent being capable of at least partially degrading the substrate, said triggering signal selected from the group consisting of exposure to a reducing agent, oxidizer, chelating agent, radical initiator, carbonic acid, ozone, chlorine, bromine, peroxide, electric current, ultrasound, change in pH, change in salinity, change in ion concentration, reversal of wellbore pressure-differential, and combinations thereof.

2. The method of claim 1 wherein said step of applying a triggering signal comprises exposing the inactivated substrate-degrading agent to a change in pH environment.

3. The method of claim 2 wherein said step of exposing the inactivated substrate-degrading agent to a change in pH comprises lowering the pH environment.

4. The method of claim 3 wherein said step of lowering the pH environment comprises exposing the inactivated substrate-degrading agent to carbonic acid.

5. The method of claim 1 wherein said step of applying a triggering signal comprises exposing The inactivated substrate-degrading agent to a change in salinity.

6. The method of claim 1 wherein said step of applying a triggering signal comprises exposing the inactivated substrate-degrading agent to a reducing agent.

7. The method of claim 1 wherein said step of applying a triggering signal comprises exposing the inactivated substrate-degrading agent to an oxidizer.

8. The method of claim 1 wherein said step of applying a triggering signal comprises exposing the inactivated substrate-degrading agent to a chelating agent.

9. The method of claim 1 wherein said step of applying a triggering signal comprises exposing the inactivated substrate-degrading agent to a radical initiator.

10. The method of claim 1 wherein said step of applying a triggering signal comprises exposing the inactivated substrate-degrading agent to ozone.

11. The method of claim 1 wherein said step of applying a triggering signal comprises exposing the inactivated substrate-degrading agent to chlorine or bromine.

12. The method of claim 1 wherein said step of applying a triggering signal comprises exposing the inactivated substrate-degrading agent to peroxide.

13. The method of claim 1 wherein said step of applying a triggering signal comprises exposing the inactivated substrate-degrading agent to an electric current.

14. The method of claim 1 wherein said step of applying a triggering signal comprises exposing the inactivated substrate-degrading agent to ultrasound.

15. The method of claim 1 wherein said step of applying a triggering signal comprises exposing the inactivated substrate-degrading agent to a change in ion concentration.

16. The method of claim 1 comprising exposing the inactivated substrate-degrading agent to a reversal of wellbore pressure-differential.

17. The method of claim 1 wherein said substrate-degrading agent comprises at least one agent chosen from the group consisting of enzymes, microorganisms, spores and inorganic chemicals.

18. The method of claim 1 wherein said encapsulation comprises encapsulating said substrate-degrading agent with an encapsulating material that maintains the substrate-degrading agent substantially inactive initially, and is responsive to said triggering signal such that at least a portion of said substrate-degrading agent is released by said encapsulating material upon exposure to said triggering signal.

19. The method of claim 1 wherein said encapsulating material is formed of a co-polymer of (a) an ethylenically unsaturated hydrophobic monomer with (b) a free base monomer of the formula

$$CH_2=CR^1COXR^2NR^3R^4$$

where R is hydrogen or methyl, $R^2$ is alkylene containing at least two carbon atoms, X is O or NH, $R^3$ is a hydrocarbon group containing at least 4 carbon atoms and $R^4$ is hydrogen or a hydrocarbon group.

20. The method of claim 19 wherein $R^3$ is t-butyl and $R^4$ is hydrogen.

21. The method of claim 19 wherein $R^1$ is methyl, $R^2$ is ethylene and X is O.

22. The method of claim 19 wherein the hydrophobic monomer is a styrene or methylmethacrylate.

23. The method of claim 19 wherein said encapsulating material is a co-polymer of styrene or methyl methacrylate with t-butyl amino ethyl methacrylate.

24. The method of claim 19 wherein said co-polymer is 55 to 80 weight % styrene, methyl styrene or methyl methacrylate with 20 to 45 weight % t-butylamino-ethyl methacrylate.

25. The method of claim 18 wherein the fluid or solid comprises at least two inactivated substrate-degrading agents, each of which is inactivated by encapsulation, wherein the inactivated substrate-degrading agents are capable of being activated by the same or different triggering signals, such that upon activation the activated substrate-degrading agents are capable of acting upon the same or different substrates independently or in concert.

26. The method of claim 17 wherein said substrate-degrading agent comprises an endo-amylase.

27. The method of claim 17 wherein said substrate-degrading agent is alpha-amylase.

28. The method of claim 17 wherein said substrate-degrading agent comprises at least one enzyme selected from the group consisting of exo-amylases, isoamylases, glucosidases, amylo-glucosidases, malto-hydrolases, maltosidases, isomalto-hydrolases and malto-hexaosidases.

29. The method of claim 17 wherein the released substrate-degrading agent is capable of being deactivated by application of a second triggering signal, wherein the second triggering signal may be the same or a different triggering signal, such that the deactivated substrate-degrading agent no longer acts on the substrate.

30. The method of claim 1 wherein the degradable substrate is selected from the group consisting of celluloses, derivatized celluloses, starches, derivatized starches, xanthans and defivatized xanthans.

31. The method of claim 1 wherein the fluid is chosen from the group consisting of circulating drilling fluid, completion fluid, simulation fluid, gravel packing fluid and workover fluid.

32. The method of claim 1 wherein the fluid is a fracturing fluid.

33. The method of claim 1 wherein said solid comprises a device or particle suitable for use downhole or on the surface for hydrocarbon exploitation.

34. A method of increasing the flow of hydrocarbons from a well, the method comprising:

providing a fluid comprising a degradable polymeric substrate and a substrate-degrading agent inactivated by encapsulation, said inactivated substrate-degrading agent being substantially inactive initially, and becoming active in response to a predetermined triggering signal;

introducing the fluid into a downhole environment; and, applying the triggering signal, the triggering signal being sufficient to activate the inactivated substrate-degrading agent to give an activated substrate-degrading agent, the activated substrate-degrading agent being capable of selectively degrading the substrate sufficient to alter a physical property of the fluid or a solid formed therefrom such that the flow of hydrocarbons from said well is increased, wherein said triggering signal is chosen from the group consisting of reducing agent, oxidizer, chelating agent, radical initiator, carbonic acid, ozone, chlorine, bromine, peroxide, electric current, ultrasound, change in pH, change in salinity, change in ion concentration, reversal of wellbore pressure-differential, and combinations thereof.

35. The method of claim 34 comprising:

carrying out drilling activity wherein said fluid comprises a circulating drilling fluid containing the polymeric substrate and the inactivated substrate-degrading agent, wherein the agent comprises an inactivated enzyme that is capable of withstanding the dynamic environmental conditions generated while drilling; and forming a low-permeability filter cake or fluid invasion zone containing said degradable polymeric substrate and said inactivated enzyme, said low-permeability filter cake or fluid invasion zone retaining low-permeability until receipt of said triggering signal sufficient to activate at least a portion of said enzyme.

36. The method of claim 34 wherein the agent comprises more than one inactivated enzyme, wherein the inactivated enzymes are capable of being activated by the same or different triggering signals, wherein upon activation the activated enzymes are capable of acting upon the same or different substrates.

37. The method of claim 34 wherein the fluid is chosen from the group consisting of a circulating drilling fluid, a completion fluid a workover fluid, a fracturing fluid, a gravel packing fluid and a stimulation fluid.

38. A method of degrading filter cake, the method comprising:

providing a fluid comprising a polymeric viscosifier or fluid loss control agent and an enzyme inactivated by sequestration, said inactivated enzyme being responsive to a predetermined triggering signal;

introducing the fluid into a downhole environment such that a filter cake containing said polymeric viscosifier or fluid loss control agent and said inactivated enzyme is formed;

applying the triggering signal selected from the group consisting reducing agent, oxidizer, chelating agent, radical initiator, carbonic acid, ozone, chlorine, bromine, peroxide, electric current, ultrasound, change in salinity, change in pH, change in ion concentration, reversal of wellbore pressure-differential, and combinations thereof, to activate the inactivated enzyme to give an activated enzyme, the activated enzyme being capable of selectively degrading said polymeric viscosifier or fluid loss control agent such that said filter cake containing said viscosifier or fluid loss control agent at least partially disintegrates, and dislodging a piece of drilling equipment from said at least partially disintegrated filter cake.

39. A wellbore treatment method comprising:

providing a fluid or a solid, or mixture thereof, containing a substrate-degrading agent inactivated by sequestration, said inactivated substrate-degrading agent being responsive to a predetermined triggering signal such that said substrate-degrading agent becomes activated upon exposure to said triggering signal, the activated substrate-degrading agent being capable of degrading a previously existing downhole substrate;

introducing said fluid or solid, or mixture thereof, into a downhole environment that contains said substrate;

providing said triggering signal selected from the group consisting of exposure to a reducing agent, oxidizer, chelating agent, radical initiator, carbonic acid, ozone, chlorine, bromine, peroxide, electric current, ultrasound, change in salinity, change in pH, change in ion concentration, reversal of wellbore pressure-differential, and combinations thereof, to activate the substrate-degrading agent; and allowing the substrate-degrading agent to at least partially degrade the substrate.

40. The method of claim 1 comprising allowing said substrate to at least partially degrade.

41. The method of claim 1 comprising initial conditions of use of said fluid or solid or mixture thereof, and subsequent conditions of use of said fluid or solid or mixture thereof resulting from said applying said triggering signal.

42. The method of claim 1 wherein said fluid or solid or mixture thereof contains said degradable substrate.

43. The method of claim 42 wherein said solid comprises a filter cake or a bridging particle.

44. The method of claim 42 comprising allowing said substrate to degrade whereby a physical property of said fluid or solid is altered, said triggering signal being incapable of effecting said alteration if applied in the absence of said inactivated substrate-degrading agent.

45. The method of claim 3 wherein said step of lowering the pH environment comprises reducing the pressure within an excavation so that naturally-occurring carbonic acid, hydrosulfuric acid, or other naturally occurring acid or precursor thereof, previously excluded from said excavation by application of higher pressure, enter into said excavation to lower the pH environment of the inactivated substrate-degrading agent.

46. The method of claim 1 wherein said inactivated substrate-degrading agent is separate from said substrate and said method comprises:

supplying said triggering signal to said fluid or solid or mixture thereof containing said inactivated substrate-degrading agent such that said substrate-degrading agent becomes activated; and exposing said activated substrate-degrading agent to said substrate.

47. The method of claim 1 wherein said inactivated substrate-degrading agent comprises particles up to about 74 microns in diameter.

48. The method of claim 1 wherein said inactivated substrate-degrading agent is capable of withstanding shear forces generated during drilling.

49. The method of claim 1 wherein said inactivated substrate-degrading agent is capable of withstanding dynamic exposure to drilling temperatures.

50. The method of claim 49 wherein said inactivated substrate-degrading agent is capable of withstanding dynamic exposure to temperatures up to 200° F.

51. The method of claim 2 wherein said inactivated substrate-degrading agent comprises an encapsulating material that becomes permeable to said substrate-degrading agent after exposure to said pH change, and said method comprises applying said pH change whereby said substrate-degrading agent passes through said encapsulating material.

52. A method of increasing the permeability of filter cake in a wellbore, the method comprising:

obtaining a polymeric viscosifier or fluid loss control agent and a breaking agent capable of degrading said polymeric viscosifier or fluid loss control agent;

encapsulating said breaking agent in an ionophoric encapsulating material to obtain an encapsulated breaking agent, said ionophoric encapsulating material being impermeable to said breaking agent at a defined first pH and permeable to said breaking agent at a defined second pH;

carrying out drilling activity whereby a filter cake is formed comprising said polymeric viscosifier or fluid loss control agent and said encapsulated breaking agent, said filter cake having a firs permeability to a defined wellbore fluid;

changing the pH of the filter cake from said first pH to said second pH, whereby permeability of said encapsulating material to said breaking agent changes such that said breaking agent becomes unencapsulated;

allowing said unencapsulated breaking agent to at least partially degrade said polymeric viscosifer or fluid loss control agent such that the permeability of said filter cake changes from said first permeability to a second permeability that is greater than said first permeability.

53. The method of claim 39 comprising removing drilling fluid from said downhole environment before applying said triggering signal.

54. The method of claim 1 further comprising exposing the inactivated substrate-degrading agent to a change in pressure and/or temperature.

55. The method of claim 33 wherein the solid comprises a perforation gun holder or a film sheath for a sand screen assembly.

56. The method of claim 34 further comprising exposing said inactivated substrate-degrading agent to a change in pressure and/or temperature.

57. The method of claim 34 wherein applying said triggering signal comprises exposing said inactivated substrate-degrading agent to a downhole reversal of wellbore pressure-differential.

58. The method of claim 34 wherein said substrate-degrading agent comprises at least one enzyme.

59. The method of claim 34 wherein said fluid comprises a drilling fluid.

60. The method of claim 39 further comprising exposing said inactivated degrading agent to a change in pressure.

61. The method of claim 39 further comprising exposing said inactivated degrading agent to a change in temperature.

62. The method of claim 39 wherein said sequestration comprises encapsulation of said degrading agent.

63. The method of claim 39 wherein said degrading agent comprises at least one enzyme.

64. The method of claim 39 wherein said fluid comprises a drilling fluid.

65. The method of claim 52 wherein said breaking agent comprises at least one enzyme.

66. The method of claim 19 wherein the fluid is chosen from the group consisting of a circulating drilling fluid, a completion fluid, a workover fluid, a fracturing fluid, a gravel packing fluid and a stimulation fluid.

67. The method of claim 19 wherein said solid comprises a device or particle suitable for use downhole or on the surface for hydrocarbon exploitation.

68. The method of claim 67 wherein said solid comprises a filter cake or a bridging particle.

69. The method of claim 57 wherein said downhole reversal of wellbore pressure-differential causes the release of $CO_2$ in the downhole environment which causes a change in pH.

70. The method of claim 1 wherein said encapsulated substrate-degrading agent is capable of responding to said triggering signal such that said agent becomes sufficiently unencapsulated to allow said agent to degrade the substrate.

71. A method of degrading a predetermined substrate used for hydrocarbon exploitation comprising:

providing a fluid or a solid, or a mixture thereof, containing a substrate-degrading agent inactivated by sequestration, said inactivated substrate-degrading agent initially being substantially inactive, and subsequently becoming active in response to a predetermined triggering signal; and applying said triggering signal to said fluid or solid or mixture thereof such that said substrate-degrading agent becomes activated, the activated substrate-degrading agent being capable of at least partially degrading the substrate, wherein said triggering signal is select the group consisting of exposure to a reducing agent oxidizer, chelating agent, radical initiator, carbonic acid, ozone, chlorine, bromine, peroxide, electric current, ultrasound, change in salinity, change in pH, change in ion concentration, reversal of wellbore pressure-differential, and combinations thereof, and exposing the inactivated substrate-degrading agent to a change in pH environment, and wherein exposing the inactivated substrate-degrading agent to a change in pH comprises lowering the pH environment, and wherein lowering the pH environment comprises exposing the inactivated substrate-degrading agent to carbonic acid.

72. The method of claim 52 wherein said encapsulating material is formed of a co-polymer of (a) an ethylenically unsaturated hydrophobic monomer with (b) a free base monomer of the formula $$CH_2=CR^1COXR^2NR^3R^4$$

where R is hydrogen or methyl, $R^2$ is alkylene containing at least two carbon atoms, X is O or NH, $R^3$ is a hydrocarbon group containing at least 4 carbon atoms and $R^4$ is hydrogen or a hydrocarbon group.

73. The method of claim 72 wherein $R^3$ is t-butyl and $R^4$ is hydrogen.

74. The method of claim 72 wherein $R^1$ is methyl, $R^2$ is ethylene and X is O.

75. The method of claim 72 wherein the hydrophobic monomer is a styrene or methylmethacrylate.

76. The method of claim 72 wherein said encapsulating material is a co-polymer of styrene or methyl methacrylate with t-butyl amino ethyl methacrylate.

77. The method of claim 72 wherein said co-polymer is 55 to 80 weight % styrene, methyl styrene or methyl methacrylate with 20 to 45 weight % t-butylamino-ethyl methacrylate.

78. The method of claim 1 wherein said substrate-degrading agent inactivated by encapsulation is prepared prior to containment in said fluid, solid or mixture thereof.

79. The method of claim 34 wherein said substrate-degrading agent inactivate by encapsulation is prepared prior to containment in said fluid.

80. The method of claim 39 wherein said substrate-degrading agent inactivated by encapsulation is prepared prior to containment in said fluid, solid or mixture thereof.

81. The method of claim 52 comprising combining said encapsulated breaking agent and said polymeric viscosifier or fluid loss control agent in a drilling fluid.

* * * * *